(12) United States Patent
Kim et al.

(10) Patent No.: US 12,493,393 B2
(45) Date of Patent: Dec. 9, 2025

(54) METHOD FOR OPERATING FLEXIBLE DISPLAY, AND ELECTRONIC DEVICE

(71) Applicant: Samsung Electronics Co., Ltd., Suwon-si (KR)

(72) Inventors: Minuk Kim, Suwon-si (KR); Jongkon Bae, Suwon-si (KR); Kyungtae Kim, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 18/317,416

(22) Filed: May 15, 2023

(65) Prior Publication Data

US 2023/0280875 A1 Sep. 7, 2023

Related U.S. Application Data

(63) Continuation of application No. PCT/KR2021/017139, filed on Nov. 22, 2021.

(30) Foreign Application Priority Data

Nov. 20, 2020 (KR) .................. 10-2020-0157013
Mar. 17, 2021 (KR) .................. 10-2021-0034878

(51) Int. Cl.
*G06F 3/0481* (2022.01)
*G06F 1/16* (2006.01)
(Continued)

(52) U.S. Cl.
CPC .......... *G06F 3/0481* (2013.01); *G06F 1/1624* (2013.01); *G06F 1/1652* (2013.01);
(Continued)

(58) Field of Classification Search
CPC .... G06F 3/0481; G06F 3/0412; G06F 1/1624; G06F 1/1652; H04M 1/0237; H04M 1/0268

See application file for complete search history.

(56) References Cited

U.S. PATENT DOCUMENTS 10,379,577 B2 8/2019 Yeom
10,503,211 B2 12/2019 Yee et al.
(Continued)

FOREIGN PATENT DOCUMENTS

EP 2965168 A1 1/2016
EP 3 001 650 A2 3/2016
(Continued)

OTHER PUBLICATIONS

Shuo-Han Chen et al., Folding State Recognition for Multi-Foldable Mobile Devices, Mar. 1, 2017, Southeast Conference, pp. 1-2 (Year: 2017).*

(Continued)

*Primary Examiner* — Tam T Tran
(74) *Attorney, Agent, or Firm* — Jefferson IP Law, LLP

(57) ABSTRACT

An electronic device is provided. The electronic device includes a first housing, a second housing foldably connected to the first housing through a hinge device, a flexible display arranged to be supported by the second housing from the first housing through the hinge device, a touch sensor, a memory, and a processor. The processor is configured to operate a partial region of the touch sensor in a first mode in a folded state in which the first housing is folded with respect to the second housing, detect sliding motion in the folded state on the basis of the flexible display, confirm, in response to the sliding motion, a first display area in which the flexible display is exposed to the outside, and switch the (Continued)

touch sensor corresponding to the confirmed first display area from the first mode to a second mode.

21 Claims, 13 Drawing Sheets

(51) Int. Cl.
*G06F 3/041* (2006.01)
*H04M 1/02* (2006.01)

(52) U.S. Cl.
CPC ........ *G06F 3/0412* (2013.01); *H04M 1/0237* (2013.01); *H04M 1/0268* (2013.01)

(56) References Cited

U.S. PATENT DOCUMENTS

| | | | |
|---|---|---|---|
| 10,666,780 | B2 | 5/2020 | Cho et al. |
| 11,032,920 | B2 | 6/2021 | Kim |
| 2010/0075726 | A1 | 3/2010 | Han et al. |
| 2014/0210706 | A1 | 7/2014 | Park et al. |
| 2014/0285449 | A1 | 9/2014 | Cho et al. |
| 2016/0070305 | A1 | 3/2016 | Kim et al. |
| 2016/0205794 | A1 | 7/2016 | Lee |
| 2016/0291642 | A1 | 10/2016 | Kwak et al. |
| 2017/0003756 | A1 | 1/2017 | Gao et al. |
| 2017/0003793 | A1 | 1/2017 | Gao et al. |
| 2017/0075388 | A1 | 3/2017 | Yee et al. |
| 2018/0059822 | A1 | 3/2018 | Seo et al. |
| 2018/0081473 | A1 | 3/2018 | Seo et al. |
| 2018/0110139 | A1 | 4/2018 | Seo et al. |
| 2018/0375975 | A1* | 12/2018 | Kikuchi ................ G06F 1/1686 |
| 2019/0245955 | A1* | 8/2019 | Lee ..................... H04M 1/0268 |
| 2020/0178406 | A1 | 6/2020 | Tyagi et al. |
| 2020/0249897 | A1 | 8/2020 | De Paz |
| 2020/0264727 | A1 | 8/2020 | Lee et al. |
| 2020/0301641 | A1* | 9/2020 | Park ...................... G06F 1/3265 |
| 2020/0326754 | A1 | 10/2020 | Kim et al. |
| 2020/0411346 | A1 | 12/2020 | Oh et al. |

FOREIGN PATENT DOCUMENTS

| | | |
|---|---|---|
| EP | 3254448 A1 | 12/2017 |
| KR | 10-2010-0033622 A | 3/2010 |
| KR | 10-2014-0115226 A | 9/2014 |
| KR | 10-2016-0097035 A | 8/2016 |
| KR | 10-2016-0118041 A | 10/2016 |
| KR | 10-2017-0067355 A | 6/2017 |
| KR | 10-2017-0082926 A | 7/2017 |
| KR | 10-2018-0026024 A | 3/2018 |
| KR | 10-2018-0031886 A | 3/2018 |
| KR | 10-2018-0040968 A | 4/2018 |
| KR | 10-2019-0004618 A | 1/2019 |
| KR | 10-2105958 B1 | 4/2020 |
| KR | 10-2020-0061275 A | 6/2020 |
| KR | 10-2020-0121151 A | 10/2020 |
| KR | 10-2021-0001493 U | 1/2021 |

OTHER PUBLICATIONS

International Search Report dated Feb. 23, 2022, issued in an International Application No. PCT/KR2021/017139.
European Search Report dated Mar. 19, 2024, issued in European Application No. 21895169.7.
Korean Office Action dated Oct. 15, 2025, issued in Korean Application No. 10-2021-0034878.

* cited by examiner

METHOD FOR OPERATING FLEXIBLE DISPLAY, AND ELECTRONIC DEVICE

CROSS-REFERENCE TO RELATED APPLICATION(S)

This application is a continuation application, claiming priority under § 365(c), of an International application No. PCT/KR2021/017139, filed on Nov. 22, 2021, which is based on and claims the benefit of a Korean patent application number 10-2020-0157013, filed on Nov. 20, 2020, in the Korean Intellectual Property Office, and of a Korean patent application number 10-2021-0034878, filed on Mar. 17, 2021, in the Korean Intellectual Property Office, the disclosure of each of which is incorporated by reference herein in its entirety.

BACKGROUND

1. Field

The disclosure relates to a method for operating a flexible display, and an electronic device.

2. Description of Related Art

Electronic devices have gradually become slim, and have been improved to increase the rigidity of the electronic devices, to enhance the design aspect thereof, and to differentiate functional elements thereof. Electronic devices have evolved from unilaterally rectangular shapes to more diversified shapes. An electronic device may have a deformable structure such that a large-screen display can be used while ensuring portability. Examples of the deformable structure include a foldable electronic device including at least two foldable housings which operate so as to be folded or unfolded with regard to each other, a slidable electronic device including housings configured to slide by a designated reciprocating distance with regard to each other, or a rollable electronic device configured such that the shape of at least one housing is changed in a rolling type. Such electronic devices may include a flexible display which can at least partially bend, and which face housings deformed in various manners, and the flexible display may be required to have improved curvature characteristics.

The above information is presented as background information only to assist with an understanding of the disclosure. No determination has been made, and no assertion is made, as to whether any of the above might be applicable as prior art with regard to the disclosure.

SUMMARY

A foldable electronic device including a first housing and a second housing may include a main display (for example, flexible display) and a sub display. The foldable electronic device may operate in a folding state (for example, folding state) and in an unfolding state (for example, flat state or unfolding state), and the first housing and the second housing may be disposed in the folding state such that one surfaces thereof overlap each other. In the folding state, the main display may be in-folded and not exposed to the outside, and the foldable electronic device may provide at least one content to the user through the sub display. According to an embodiment, the foldable electronic device may be in a state in which the main display is in-folded in the folding state, and the main display is difficult to utilize.

According to various embodiments, at least one of a first housing and a second housing of a foldable electronic device (for example, electronic device) may perform a sliding operation, and at least a part of the main display thereof may be exposed to the outside when performing the sliding operation.

Aspects of the disclosure are to address at least the above-mentioned problems and/or disadvantages and to provide at least the advantages described below. Accordingly, an aspect of the disclosure is to provide an electronic device that provides a partial area of the main display, which is exposed to the outside, to the user as a display area according to a sliding operation.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing foldably connected to the first housing through a hinge device, a flexible display disposed to be supported by the second housing through the hinge device from the first housing, a touch sensor at least partially disposed to correspond to the flexible display, a memory, and a processor operatively connected to the flexible display, the touch sensor, and the memory. The processor may be configured to operate at least a partial region of the touch sensor in a first mode in a folded state where the first housing and the second housing are folded, detect a sliding operation in the folded state, based on the flexible display, identify a first display region, in which the flexible display is exposed to the outside, in response to the sliding operation, and switch the touch sensor corresponding to the identified first display region from the first mode to a second mode.

In accordance with another aspect of the disclosure, a method is provided. The method includes operating, in a first mode, at least a partial region of a touch sensor corresponding to a flexible display supported by a first housing and a second housing, in a folded state where the first housing and the second housing are folded, based on a hinge device, detecting a sliding operation in the folded state, based on the flexible display, identifying a first display region in which the flexible display is exposed to the outside, in response to the sliding operation, and switching the touch sensor corresponding to the identified first display region from the first mode to a second mode.

Various embodiments of the disclosure may provide an electronic device designed to have a structure wherein, in a folded state of the electronic device including a first housing and a second housing, a sliding operation is possible with regard to at least one housing. In the folded state, the electronic device may sense a sliding operation, and may switch an operating mode related to a flexible display (for example, a touch sensor disposed to correspond to the flexible display) in response to the sliding operation. According to an embodiment, the electronic device may utilize the flexible display, which is at least partially exposed to the outside, as a display area according to a sliding operation. User convenience may be improved. Various other advantageous effects identified explicitly or implicitly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
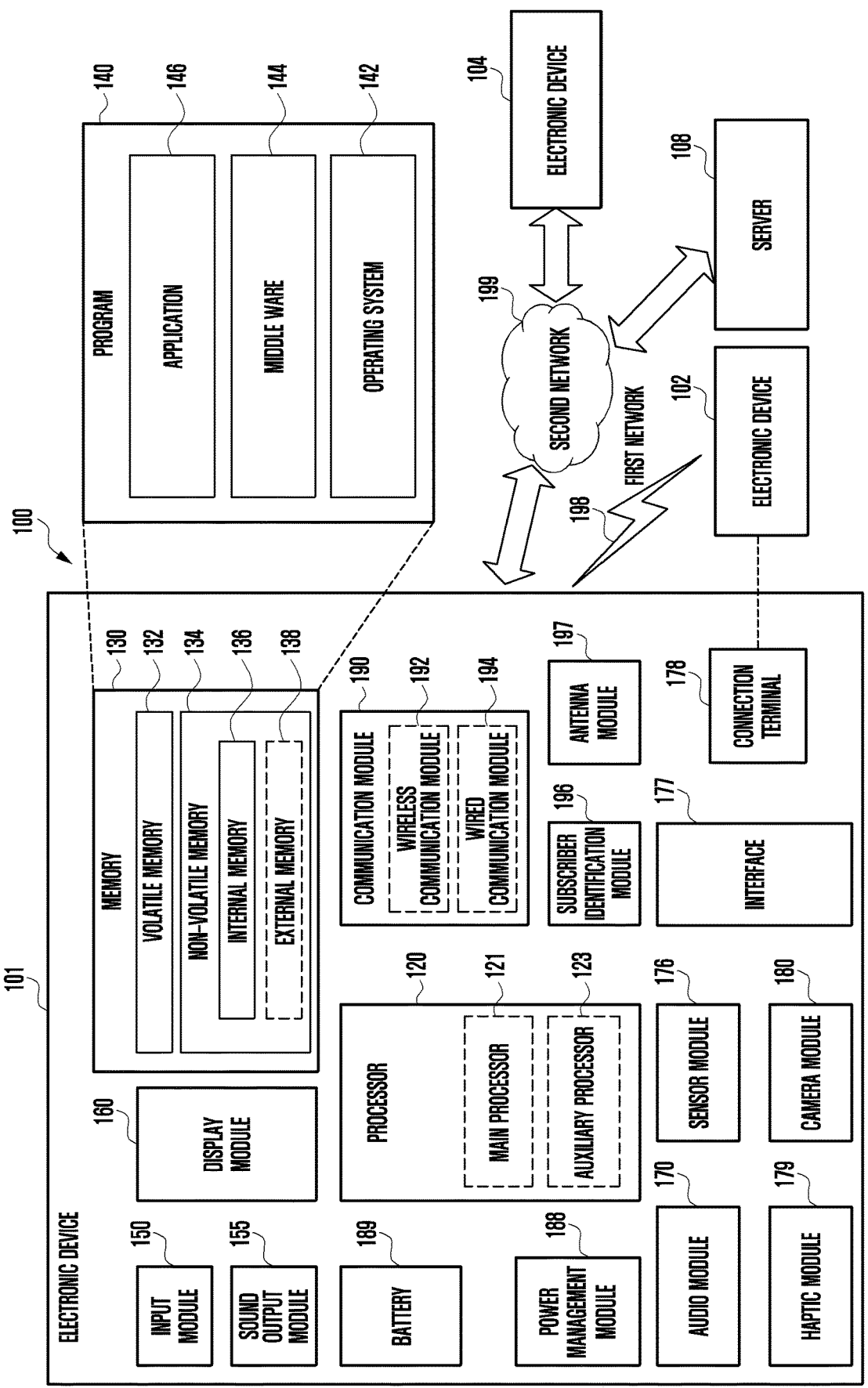
FIG. 1 is a block diagram of an electronic device in a network environment according to an embodiment of the disclosure.

FIG. 1 illustrates an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
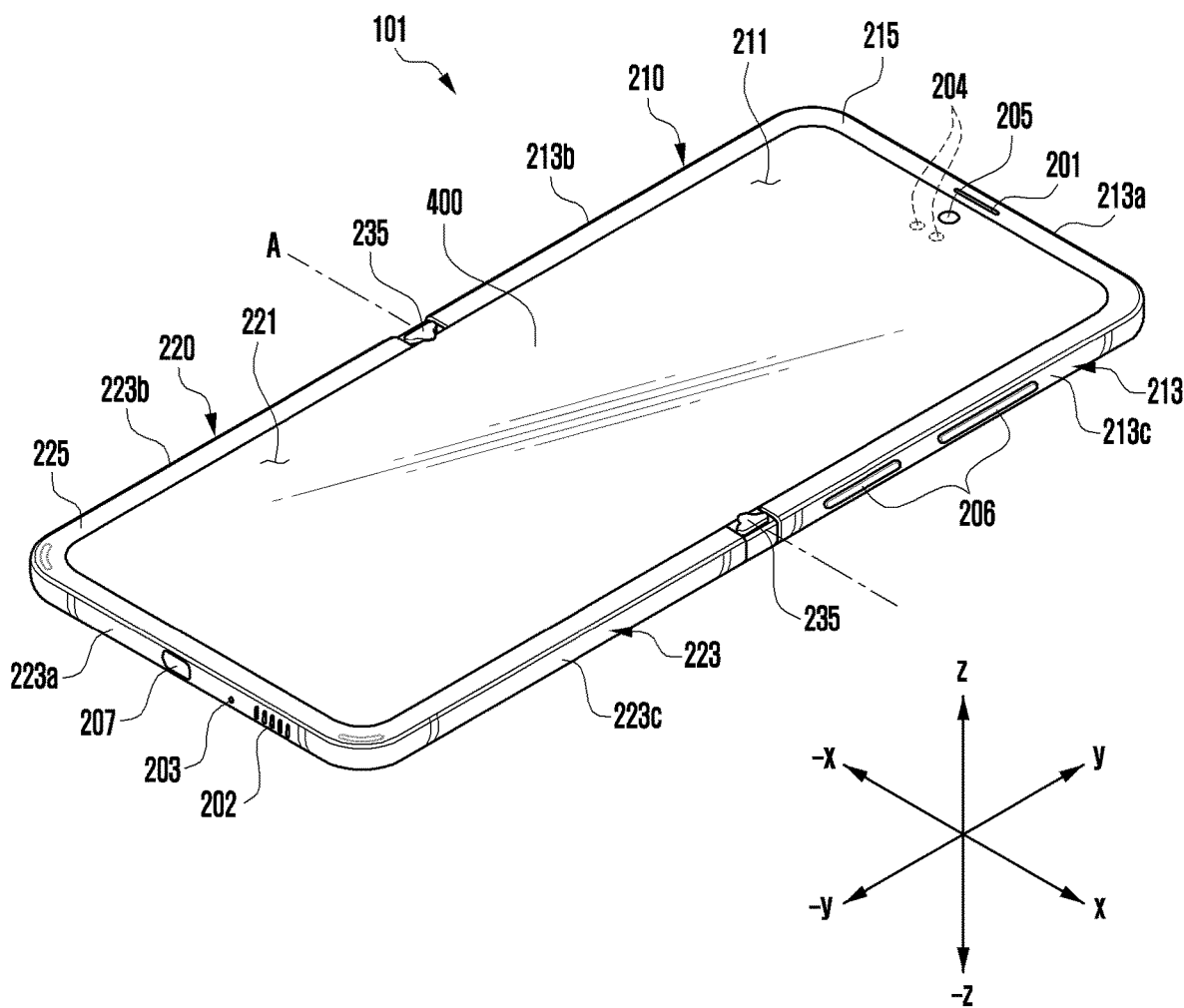
FIG. 2A is a front perspective view showing an electronic device in an unfolded state (a flat state or an unfolding state) according to an embodiment of the disclosure.
Figure 2B:
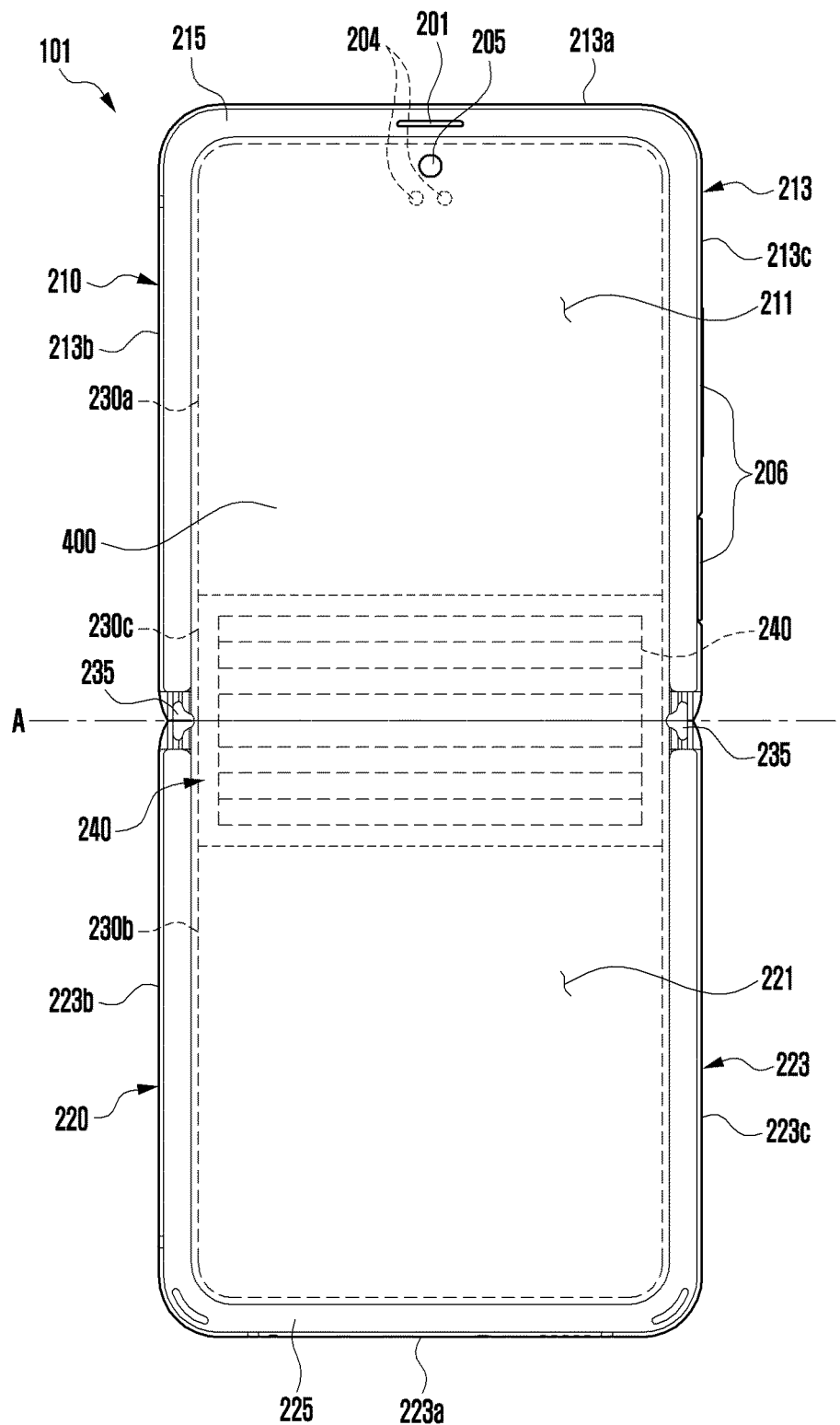
FIG. 2B is a plan view showing the front surface of an electronic device in an unfolded state according to an embodiment of the disclosure.
Figure 2C:
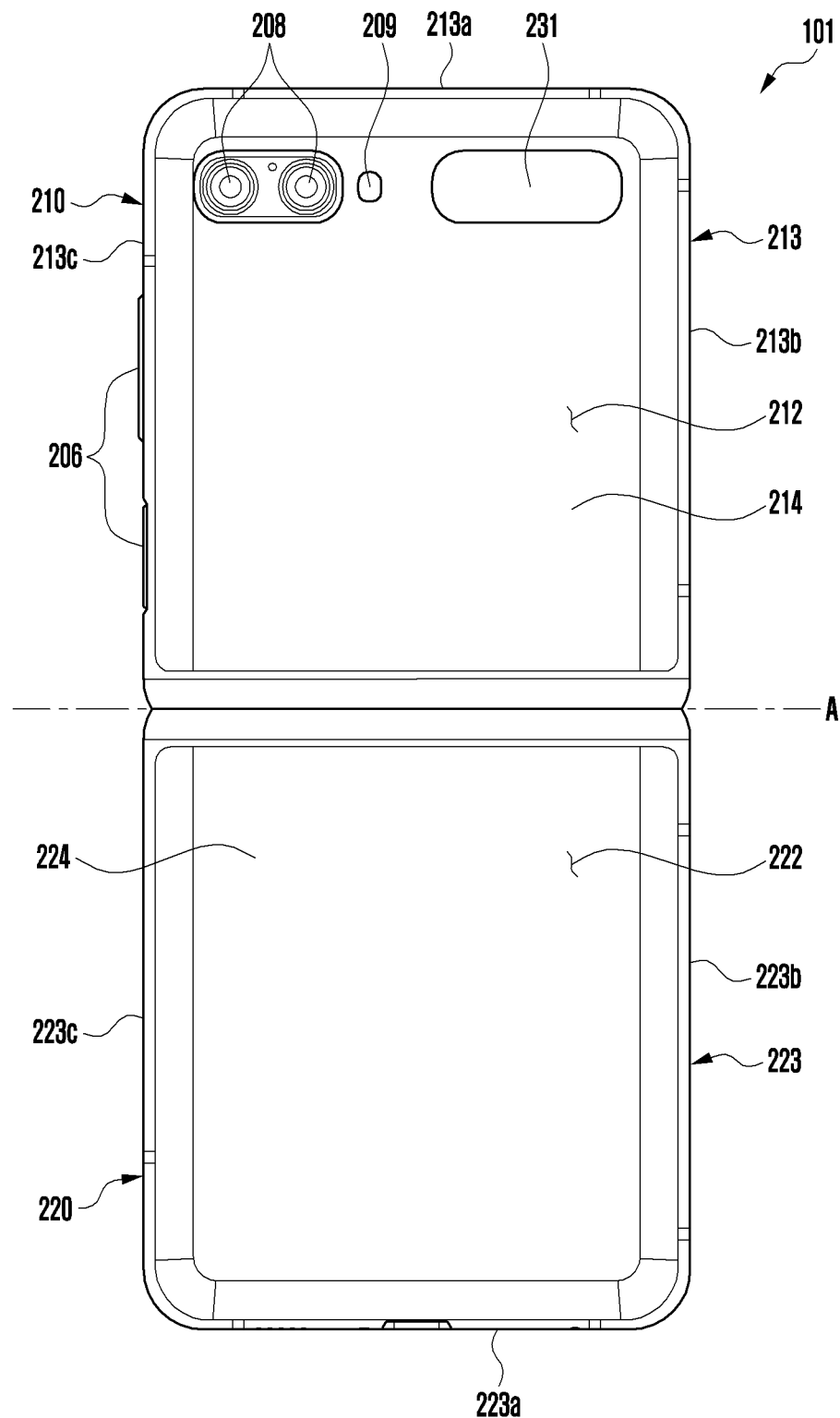
FIG. 2C is a plan view showing the rear surface of an electronic device in an unfolded state according to an embodiment of the disclosure.

FIG. 2A is a perspective view showing an electronic device in an unfolded state (a flat state or an unfolding state) according to an embodiment of the disclosure. FIG. 2B is a plan view showing the front surface of an electronic device in an unfolded state according to an embodiment of the disclosure. FIG. 2C is a plan view showing the rear surface of an electronic device in an unfolded state according to an embodiment of the disclosure.

Figure 3A:
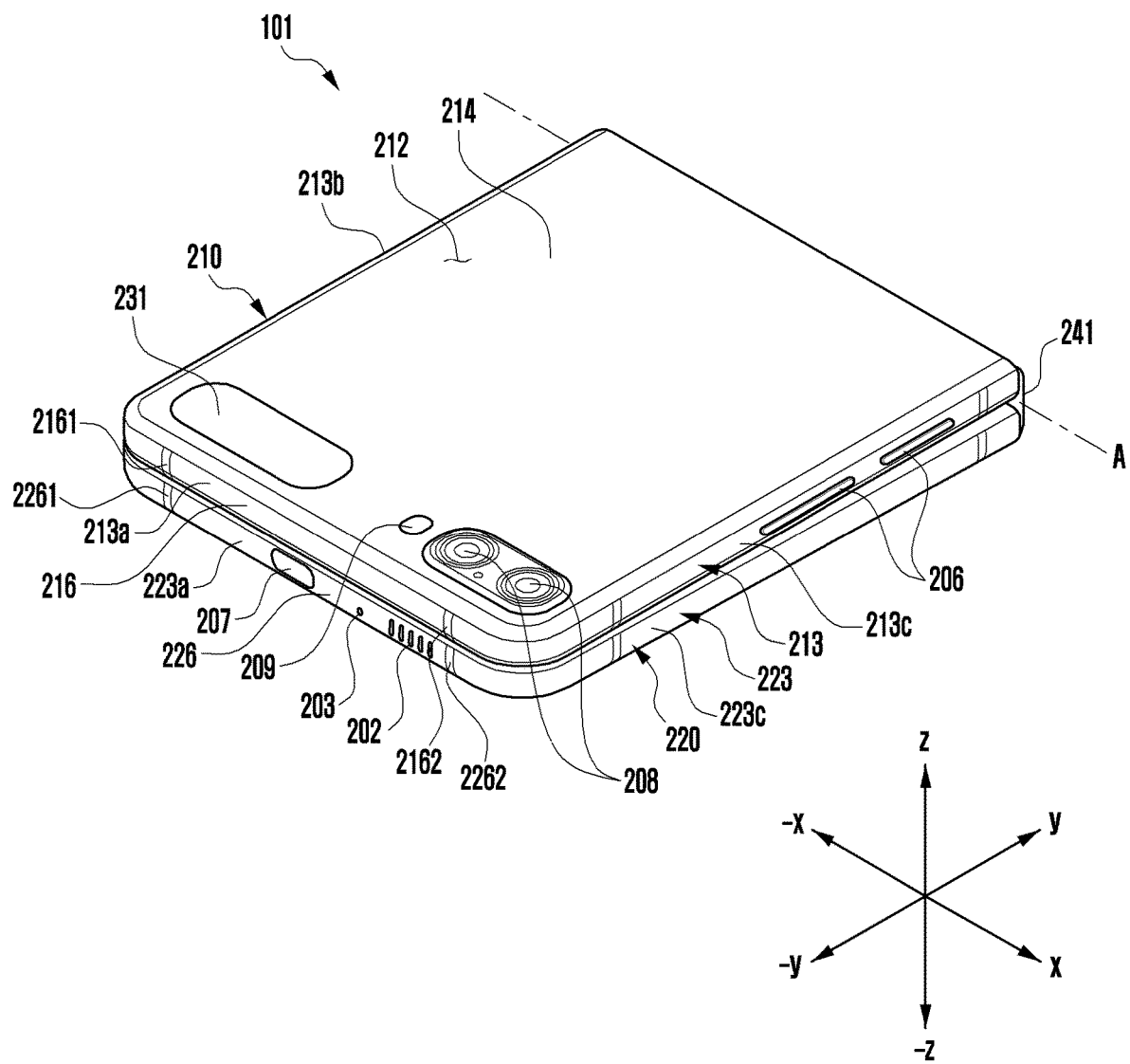
FIG. 3A is a perspective view showing an electronic device in a folded state (a folding state) according to an embodiment of the disclosure.
Figure 3B:
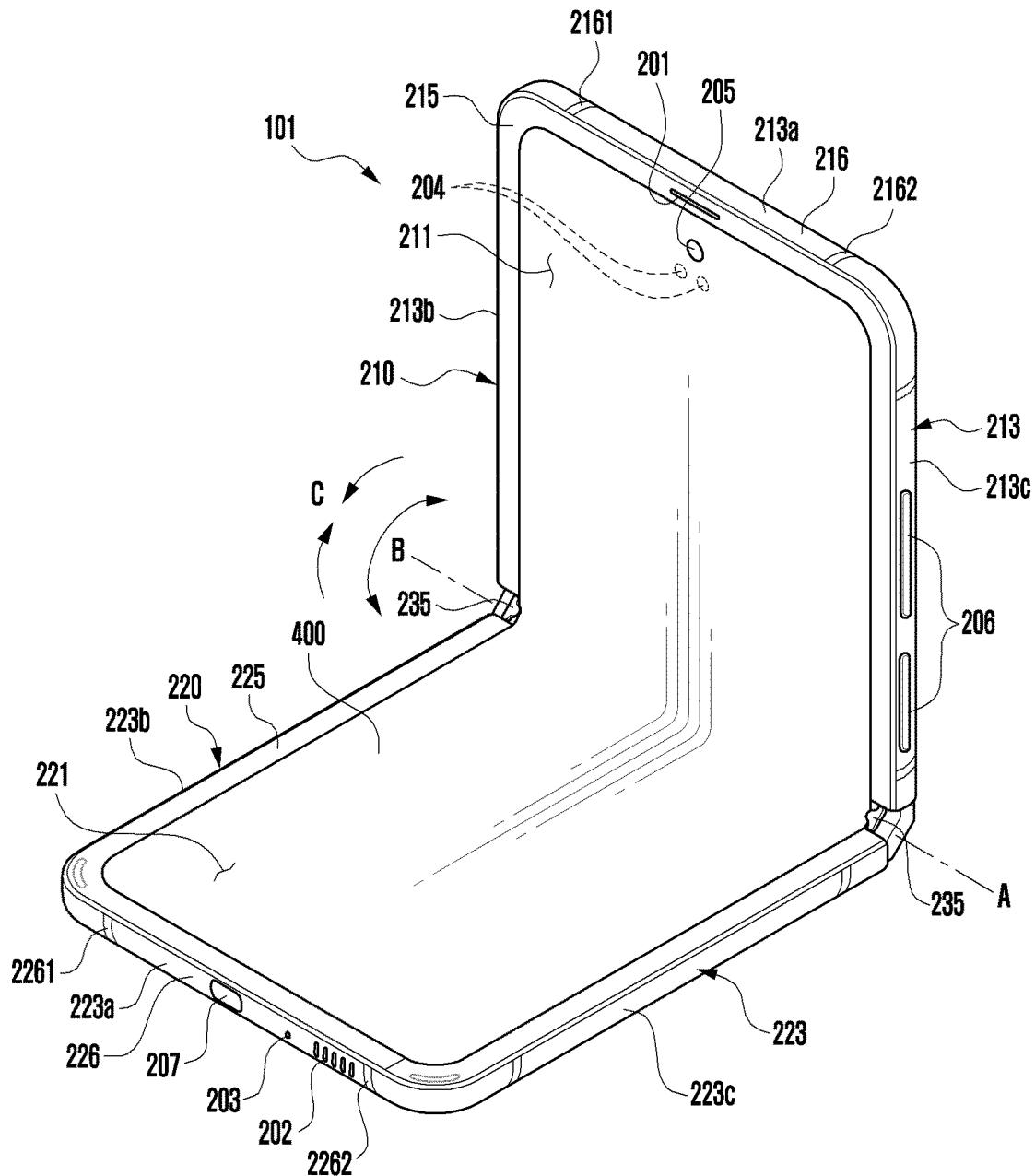
FIG. 3B is a perspective view showing an electronic device in an intermediate state according to an embodiment of the disclosure.

FIG. 3A is a perspective view showing an electronic device in a folded state (a folding state) according to an embodiment of the disclosure. FIG. 3B is a perspective view showing an electronic device in an intermediate state according to an embodiment of the disclosure.

Referring to FIGS. 2A, 2B, 2C, 3A, and 3B, an electronic device 101 (e.g., the electronic device 101 in FIG. 1) may include one pair of housings 210 and 220 (e.g., a foldable housing) which are rotatably coupled to be folded while facing each other with reference to a hinge device (e.g., the hinge device 240 in FIG. 2B). The hinge device (e.g., the hinge device 240 in FIG. 2B) may be disposed in the X-axis direction or disposed in the Y-axis direction. Two or more hinge devices (e.g., the hinge device 240 in FIG. 2B) may also be arranged to be folded in the same direction or in different directions. The electronic device 101 may include a flexible display 400 (e.g., a foldable display) disposed in a region formed by the one pair of housings 210 and 220. A first housing 210 and a second housing 220 may be arranged at both sides around a folding axis (the axis A), and may have a substantially symmetrical shape with respect to the folding axis (the axis A). The first housing 210 and the second housing 220 may have different angles formed by each other or different distances from each other according to whether the state of the electronic device 101 is an unfolded state (a flat state or an unfolding state), a folded state (a folding state), or an intermediate state.

The one pair of housings 210 and 220 may include the first housing 210 (e.g., a first housing structure) coupled to a hinge device (e.g., the hinge device 240 in FIG. 2B), and the second housing 220 (e.g., a second housing structure) coupled to the hinge device (e.g., the hinge device 240 in FIG. 2B). In an unfolded state, the first housing 210 may include a first surface 211 oriented a first direction (e.g., the front surface direction) (the z-axis direction) and a second surface 212 oriented a second direction (e.g., the rear surface direction) (the –z-axis direction) opposite to the first surface 211. In an unfolded state, the second housing 220 may include a third surface 221 oriented in the first direction (the z-axis direction) and the fourth surface 222 oriented the second direction (the –z-axis direction).

According to an embodiment of the disclosure, the electronic device 101 may be configured to operate in a manner such that the first surface 211 of the first housing 210 and the third surface 221 of the second housing 220 are oriented in substantially the same first direction (the z-axis direction) in an unfolded state, and the first surface 211 and the third surface 221 face each other in a folded state. According to another embodiment of the disclosure, the electronic device 101 may be configured to operate in a manner such that the second surface 212 of the first housing 210 and the fourth surface 222 of the second housing 220 are oriented in substantially the same second direction (the –z-axis direction) in an unfolded state, and the second surface 212 and the fourth surface 222 are oriented in directions opposite to each other in a folded state. For example, in a folded state, the second surface 212 may be oriented in the first direction (the z-axis direction), and the fourth surface 222 may be oriented in the second direction (the –z-axis direction).

The first housing 210 may include a first side member 213 which at least partially forms the exterior of the electronic device 101, and a first rear cover 214 which is coupled to the first side member 213 and forms at least a part of the second surface 212 of the electronic device 200. The first side member 213 may include a first side surface 213a, a second side surface 213b extending from one end of the first side surface 213a, and a third side surface 213c extending from the other end of the first side surface 213a. The first side member 213 may be formed in a long rectangular shape (e.g., a square or a rectangle) by the first side surface 213a, the second side surface 213b, and the third side surface 213c.

The second housing 220 may include a second side member 223 which at least partially forms the exterior of the electronic device 101, and a second rear cover 224 which is coupled to the second side member 223 and forms at least a part of the fourth surface 222 of the electronic device 200. The second side member 223 may include a fourth side surface 223a, a fifth side surface 223b extending from one end of the fourth side surface 223a, and a sixth side surface 223c extending from the other end of the fourth side surface 223a. The second side member 223 may be formed in a long rectangular shape by the fourth side surface 223a, the fifth side surface 223b, and the sixth side surface 223c.

The one pair of housings 210 and 220 are not limited to the illustrated shape and coupling, and may be implemented in other shapes or by a combination and/or coupling of other components. For example, in some embodiments, the first side member 213 may be integrally formed with the first rear cover 214, and the second side member 223 may be integrally formed with the second rear cover 224.

In an unfolded state, the electronic device 101 may be configured such that the second side surface 213b of the first side member 213 and the fifth side surface 223b of the second side member 223 are connected to each other without any gap. In an unfolded state, the electronic device 101 may be configured such that the third side surface 213c of the first side member 213 and the sixth side surface 223c of the second side member 223 are connected to each other without any gap. In an unfolded state, the electronic device 101 may be configured such that the sum of the length of the second side surface 213b and the fifth side surface 223b is longer than the length of the first side surface 213a and/or the fourth side surface 223a. In addition, the electronic device may be configured such that the sum of the length of third side surface 213c and the sixth side surface 223c is longer than the length of the first side surface 213a and/or the fourth side surface 223a.

The first side member 213 and/or the second side member 223 may be formed of metal, or may further include polymer injected into metal. The first side member 213 and/or the second side member 223 may also include at least one conductive portion 216 and/or 226 which is electrically segmented through at least one segment portion 2161 or 2162 and/or 2261 or 2262 formed of a polymer. In this case, the at least one conductive portion may be electrically connected to a wireless communication circuit included in the electronic device 101, and thus may be used as an antenna operating in at least one designated band (e.g., a legacy band).

The first rear cover 214 and/or the second rear cover 224 may be formed of at least one or a combination of at least two of coated or colored glass, ceramic, polymer, or metal (e.g., aluminum, stainless steel (STS), or magnesium).

The flexible display 400 may be disposed to extend from the first surface 211 of the first housing 210 to at least a part of the third surface 221 of the second housing 220 while crossing a hinge device (e.g., the hinge device 240 in FIG. 2B). For example, the flexible display 400 may include a first portion 230a corresponding to at least a partial region of the first surface 211, a second portion 230b corresponding to at least a partial region of the second surface 221, and a third portion 230c (e.g., a bendable region) which connects the first portion 230a and the second portion 230b and corresponds to a hinge device (e.g., the hinge device 240 in FIG. 2B). The electronic device 101 may include a first protective cover 215 (e.g., a first protective frame or a first decoration member) coupled along the edge of the first housing 210. The electronic device 101 may include a second protective cover 225 (e.g., a second protective frame or a second decoration member) coupled along the edge of the second housing 220. The first protective cover 215 and/or the second protective cover 225 may be formed of a metal material or a polymer material. The first protective cover 215 and/or the second protective cover 225 may be used as a decoration member. The flexible display 400 may be positioned such that the edge of the first portion 230a is interposed between the first housing 210 and the first protective cover 215. The flexible display 400 may be positioned such that the edge of the second portion 230b is interposed between the second housing 220 and the second protective cover 225. The flexible display 400 may be positioned such that the edge of the flexible display 400, which corresponds to a protective cap, is protected through the protective cap 235 disposed in a region corresponding to a hinge device (e.g., the hinge device 240 in FIG. 2B). Accordingly, the edge of the flexible display 400 may be substantially protected from the outside.

The electronic device 101 may include a hinge housing 241 (e.g., a hinge cover) which supports a hinge device (e.g., the hinge device 240 in FIG. 2B), is exposed to the outside in case that the electronic device 101 is in a folded state, and is disposed to be invisible from the outside by being inserted in a first space (e.g., the inner space of the first housing 210) and a second space (e.g., the inner space of the second housing 220) in case that the electronic device is in an unfolded. The flexible display 400 may be disposed to extend from at least a part of the second surface 212 to at least a portion of the fourth surface 222. In this case, the electronic device 101 may be folded such that the flexible display 400 is exposed to the outside (an out-folding type).

The electronic device 101 may include a sub-display 231 disposed separately from the flexible display 400 (e.g., a main display). The sub-display 231 may be disposed to be at least partially exposed to the second surface 212 of the first housing 210, and in case of being in a folded state, may display state information of the electronic device 101 while replacing a display function of the flexible display 400 (e.g., a main display). The sub-display 231 may be disposed to be visible from the outside through at least a partial region of the first rear cover 214. In some embodiments, the sub-display 231 may also be disposed on the fourth surface 222 of the second housing 220. In this case, the sub-display 231 may be disposed to be visible from the outside through at least a partial region of the second rear cover 224.

The electronic device 101 may include at least one of an input device 203 (e.g., a microphone), sound output devices 201 and 202, a sensor module 204, camera modules 205 and 208, a key input device 206, or a connector port 207. In the embodiments shown in FIGS. 2A-2C, the input device 203 (e.g., a microphone), the sound output devices 201 and 202, the sensor module 204, the camera modules 205 and 208, the key input device 206, and/or the connector port 207 may be shown as a hole or a shape formed in the first housing 210 or the second housing 220, but may be defined to include a substantial electronic component (e.g., an input device, a sound output device, a sensor module, or a camera module) disposed inside the electronic device 101 and configured to operate through a hole or a shape.

The input device 203 may include at least one microphone 203 disposed in the second housing 220. In some embodiments, the input device 203 may include multiple microphones 203 arranged to detect the direction of sound. The multiple microphones 203 may be arranged at appropriate positions in the first housing 210 and/or the second housing 220. The sound output devices 201 and 202 may include speakers 201 and 202. The speakers 201 and 202 may include a receiver 201 for a call, which is disposed in the first housing 210, and a speaker 202 disposed in the second housing 220. In some embodiments, the input device 203, the sound output devices 201 and 202, and the connector port 207 may be arranged in a space provided in the first housing 210 and/or the second housing 220 of the electronic device 101, and may be exposed to an external environment through at least one hole formed through the first housing 210 and/or the second housing 220. The at least one connector port 207 may be used to transmit or receive power and/or data to or from an external electronic device. In some embodiments, the at least one connector port (e.g., an earjack hole) may also accommodate a connector (e.g., an earjack) for transmitting or receiving an audio signal to or from an external electronic device. In some embodiments, a hole formed through the first housing 210 and/or the second housing 220 may be commonly used for the input device 203 and the sound output devices 201 and 202. The sound output devices 201 and 202 may also include a speaker (e.g., a piezo speaker) which operates without a hole formed through the first housing 210 and/or the second housing 220.

The sensor module 204 may generate an electrical signal or a data value corresponding to an internal operation state of the electronic device 101 or an external environmental state. For example, the sensor module 204 may detect an external environment through the first surface 211 of the first housing 210. The electronic device 101 may also further include at least one sensor module disposed to detect an external environment through the second surface 212 of the first housing 210. The sensor module 204 (e.g., an illuminance sensor) may be disposed under the flexible display 400 to detect an external environment through the flexible display 400. The sensor module 204 may include at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor, a proximity sensor, a biological sensor, an ultrasonic sensor, or illumination sensor 204.

The camera modules 205 and 208 may include a first camera module 205 (e.g., a front camera module) disposed on the first surface 211 of the first housing 210, and a second camera module 208 disposed on the second surface 212 of the first housing 210. The electronic device 101 may further include a flash 209 disposed near the second camera module 208. The camera modules 205 and 208 each may include one lens or multiple lenses, an image sensor, and/or an image signal processor. For example, the flash 209 may include a light-emitting diode or a xenon lamp. The camera modules 205 and 208 may be arranged such that two or more lenses (e.g., a wide-angle lens, an ultra-wide-angle lens, or a telephoto lens) and image sensors are positioned on one surface (e.g., the first surface 211, the second surface 212, the third surface 221, or the fourth surface 222) of the electronic device 101. The camera modules 205 and 208 may also include an image sensor and/or lenses for time of flight (TOF).

The key input device 206 (e.g., a key button) may be disposed on the third side surface 213c of the first side member 213 of the first housing 210. In some embodiments, the key input device 206 may also be disposed on at least one side surface of other side surfaces 213a and 213b of the first housing 210 and/or the side surfaces 223a, 223b, and 223c of the second housing 220. In some embodiments, the electronic device 101 may omit a part or the whole of the key input device 206, and the omitted key input device 206 may also be implemented as a different type, such as a soft key, on the flexible display 400. The key input device 206 may also be implemented using a pressure sensor included in the flexible display 400.

A camera module (e.g., the first camera module 205) of the camera modules 205 and 208 and/or the sensor module 204 may be disposed to be exposed through the flexible display 400. For example, in the inner space of the electronic device 101, the first camera module 205 or the sensor module 204 may be disposed to be in contact with an external environment through an opening (e.g., a through-hole) which is at least partially formed through the flexible display 400. According to another embodiment of the disclosure, a camera module (e.g., the first camera module 205) and/or the sensor module 204 may also be disposed to perform functions thereof while not being visually exposed through the flexible display 400 in the inner space of the electronic device 101. For example, in this case, a region of the flexible display 400, which faces the camera module 205 and/or the sensor module 204, may also not require an opening. For example, the first camera module 205 may not be visually exposed, and may include a hidden display rear camera (an under-display camera (UDC)).

Referring to FIG. 3B, the electronic device 101 may also operate to maintain an intermediate state through a hinge device (e.g., the hinge device 240 in FIG. 2B). In this case, the electronic device 101 may also control the flexible display 400 such that different content is displayed on a display area corresponding to the first surface 211 and a display area corresponding to the third surface 221. The electronic device 101 may operate in a substantially unfolded state (e.g., the unfolded state in FIG. 2A) and/or in a substantially folded state (e.g., the folded state in FIG. 3A) through a hinge device (e.g., the hinge device 240 in FIG. 2B) with reference to a predetermined inflection angle (e.g., the angle between the first housing 210 and the second housing 220 in case of being in an intermediate state). When a pressing force is provided to the electronic device in an unfolding direction (the direction B) in the state where the electronic device is unfolded at a predetermined inflection angle through a hinge device (e.g., the hinge device 240 in FIG. 2B), the electronic device 101 may be operated to be switched to an unfolded state (e.g., the unfolded state in FIG. 2A). When a pressing force is provided to the electronic device in a folding direction (the direction C) in the state where the electronic device is unfolded at a predetermined inflection angle through a hinge device (e.g., the hinge device 240 in FIG. 2B), the electronic device 101 may be operated to be switched to a closed state (e.g., the folded state in FIG. 3A). According to an embodiment of the disclosure, the electronic device 101 may also operate to maintain an unfolded state (not shown) at various angles through a hinge device (e.g., the hinge device 240 in FIG. 2B).

A hinge device (e.g., the hinge device 240 in FIG. 2B) may support a folding operation in which the electronic device 101 including the first housing 210 and the second housing 220 operates to a folded state (e.g., the folded state in FIG. 3A). The electronic device 101 may be designed to have a structure capable of performing a sliding operation in a folded state. The hinge device 240 may support a folding operation in which the electronic device 101 is switched from an unfolded state to a folded state, and may also support a sliding operation in a folded state thereof. For example, the sliding operation may include an operation in which at least one of the first housing 210 and the second housing 220 slides along a predetermined direction in a folded state (e.g., the state in which the first surface 211 of the first housing 210 and the third surface 221 of the second housing 220 are in contact with each other) of the electronic device 101. The sliding operation may include an operation in which the hinge device 240 moves along a curved surface while at least partially maintaining the curved-surface shape thereof.

Figure 4A:
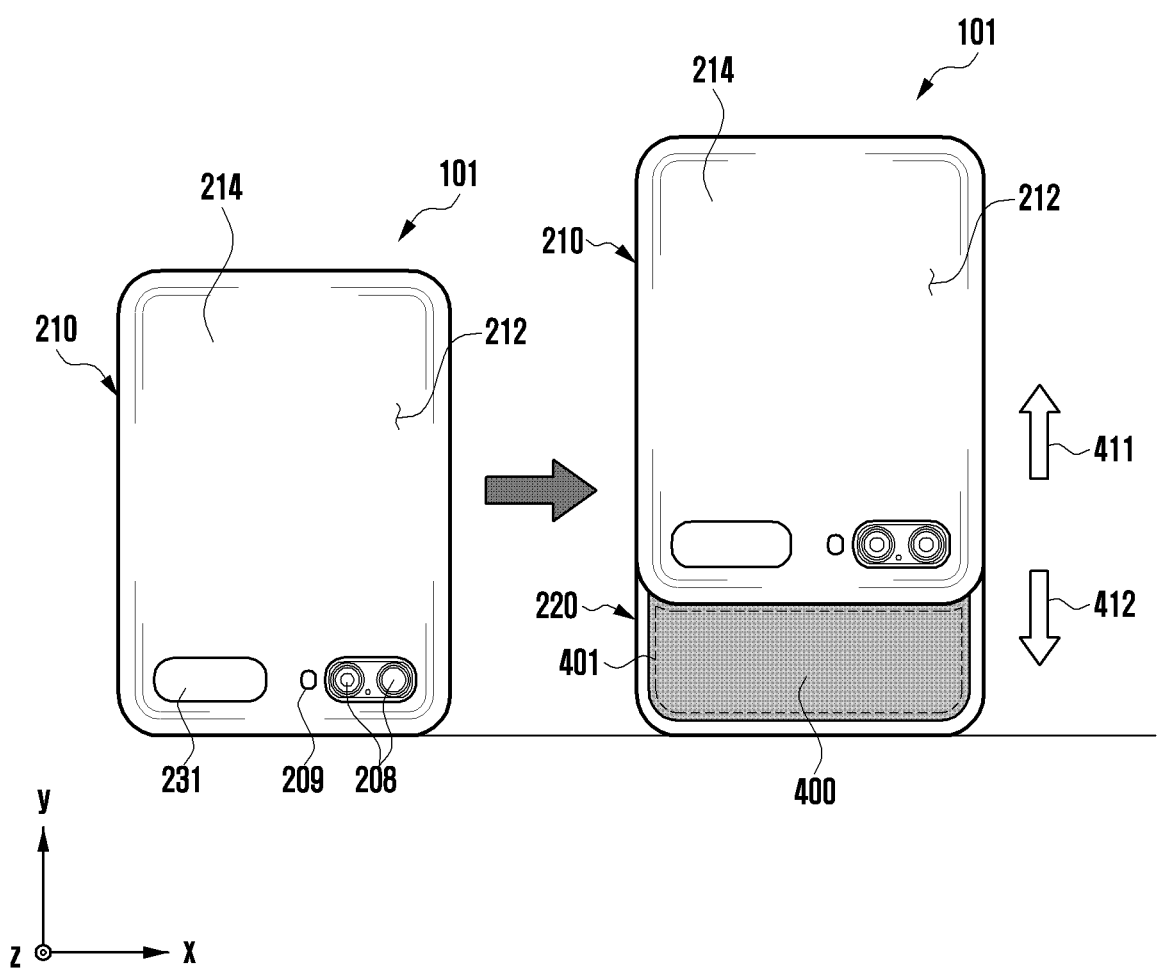
FIG. 4A is a view showing a sliding operation of an electronic device in a folded state according to an embodiment of the disclosure.

FIG. 4A is a view showing a sliding operation of an electronic device in a folded state according to an embodiment of the disclosure. FIG. 4A shows a state in which at least a partial region of the flexible display 400 is exposed to the outside as an electronic device in a folded state (a folding state) performs a sliding operation.

Referring to FIG. 4A, an electronic device (e.g., the electronic device 101 in FIG. 1) may include one pair of housings (e.g., the first housing 210 in FIG. 2A and the second housing 220 in FIG. 2A), and the first housing 210 and the second housing 220 may be rotatably coupled to be folded while facing each other with reference to a hinge device (e.g., the hinge device 240 in FIG. 2B). For example, the state, in which a first surface (e.g., the first surface 211 in FIG. 2A) of the first housing 210 and a third surface (e.g., the third surface 221 in FIG. 2A) of the second housing 220 are in contact with each other, may be a folded state. FIG. 4A shows a second surface (e.g., the second surface 212 in FIG. 2C) of the first housing 210 in the electronic device 101 in a folded state. At least a part of the second surface 212 may include a rear cover 214. A sub-display (e.g., the sub-display 231 in FIG. 3A), a flash (e.g., the flash 209 in FIG. 3A), and/or a second camera module (e.g., the second camera module 208 in FIG. 3A) may be disposed on the second surface 212 of the first housing 210. The electronic device 101 may activate the sub-display 231 in response to occurrence of an event in a folded state. For example, in case that a call comes in or a message is received, the electronic device 101 may provide a notification to a user through the sub-display 231.

The electronic device 101 may operate in a first mode (e.g., a first low-power mode or a low-power idle mode) in a folded state. For example, the first mode may be a mode in which at least one element of the electronic device 101 has been switched to a sleep mode and/or an inactive state, in order to reduce power consumption. The first mode may include a mode in which a touch sensor (e.g., the touch sensor 510 in FIG. 5) included in the sensor module 176 of the electronic device 101 is at least partially activated, and a mode capable of detecting a sliding operation of the electronic device 101 by using the touch sensor. The electronic device 101 may maintain the flexible display 400 to an inactive state in the first mode. The electronic device 101 may at least partially activate the sub-display 231 and, may display notification information indicating occurrence of an event, in response to the occurrence of the event (e.g., reception of a call, reception of a message, and/or occurrence of a notification) in the first mode. The electronic device 101 may enter the first mode when being changed from an unfolded state to a folded state. The first mode may include an operation mode in which power is least consumed in the electronic device 101. For example, the electronic device 101 may at least partially activate a touch sensor included in the sensor module 176 in case of being in the first mode, and may detect a sliding operation of the electronic device 101 through the touch sensor. The operation frequency of the electronic device 101 may be a value within a first frequency band range (e.g., a frequency band within a range of about 10 hertz (Hz)-40 Hz) in case that the electronic device operates as the first mode.

Even in case that the electronic device 101 enters the sleep mode from the first mode by the processor (e.g., the processor 120 in FIG. 1), the touch sensor 510 may be at least partially activated under the control of a touch sensor drive part (a touch screen panel (TSP) integrated circuit (IC)), and may detect a sliding operation of the electronic device 101. For example, even in case of entering the sleep mode by the processor 120, the touch sensor 510 may operate based on an operation frequency corresponding to the first mode. In the first mode, the touch sensor 510 may detect a sliding operation of the electronic device 101.

Referring to FIG. 4A, the electronic device 101 may perform a sliding operation in a folded state, based on the hinge device 240. The hinge device 240 may support a folding operation in which the first housing 210 and the second housing 220 are folded while facing each other, and may support a sliding operation in which at least one of the first housing 210 and the second housing 220 moves by a predetermined distance along a predetermined direction in a folded state. For example, the sliding operation may include an operation in which the first housing 210 moves in a first direction 411 (e.g., the +y-axis direction), an operation in which the second housing 220 moves in a second direction 412 (e.g., the −y-axis direction), or an operation in which each of the first housing 210 and the second housing 220 moves in a predetermined direction. The electronic device 101 may operate as the first mode in a folded state, and the touch sensor 510 may be in an at least partially activated state. The electronic device 101 may detect a sliding operation through the touch sensor 510 which is in an activated state.

The electronic device 101 in a folded state may perform a sliding operation, and at least a partial region 401 (e.g., a first display region) of the flexible display 400 may be exposed to the outside in response to the sliding operation. The electronic device 101 may use the first display region 401 of the flexible display 400 as an additional display in response to the sliding operation. The electronic device 101, which operates as the first mode (e.g., a first low-power mode) in a folded state, may be changed to the second mode (e.g., a second low-power mode or a low-power active mode) in response to the sliding operation. The electronic device 101 may change the flexible display from the first mode to the second mode, based on the first display region 401 exposed to the outside in response to the sliding operation. For example, the electronic device 101 may change only a part of the flexible display 400 from the first mode to the second mode. The electronic device 101 may display notification information indicating occurrence of an event (e.g., reception of a call, reception of a message, and/or occurrence of a notification), based on the first display region 401 operating as the second mode.

The second mode may include a state in which at least an element is switched to an active state, based on the first display region 401, or at least a function is performed, compared to the first mode. For example, the electronic device 101 may display notification information in the first display region 401 corresponding to the second mode or may detect a user touch input. An operation of the flexible display 400 may be further performed in the second mode, compared to the first mode, but the second mode may not be in a state of being fully activated. A scan cycle in the second mode may be relatively faster and relatively, more touch events may be detected in the second mode, compared to the first mode. An operation frequency of the electronic device 101 may be a value within a second frequency band range (e.g., a frequency band within a range of about 30 Hz-60 Hz) in case that the electronic device operates as the second mode. For example, the second frequency band range may at least partially overlap the first frequency band range.

In case that the first display region 401 operates as the second mode, the electronic device 101 may detect a specific event (e.g., a user touch input, a double touch input, a long touch input, and/or a double tap input) of the first display region 401, and may change the flexible display from the second mode to a third mode (e.g., a usual mode or a normal mode), in response to detection of the specific event. The electronic device 101 may fully activate the first display region 401 of the flexible display 400 in the third mode. For example, the third mode may include an operation in which the flexible display 400 is activated in case that the electronic device 101 is in an unfolded state. In relation to the first display region 401, in case of being changed to third mode, the electronic device 101, through the first display region 401, may display at least one content, or may perform at least one function corresponding to a user touch input. The operation frequency of the electronic device 101 may be a value within a third frequency band range (e.g., a frequency band within a range of about 10 Hz-240 Hz) in case that the electronic device operates as the third mode. For example, the third frequency band range may at least partially include the first frequency band range and the second frequency band range.

Figure 4B:
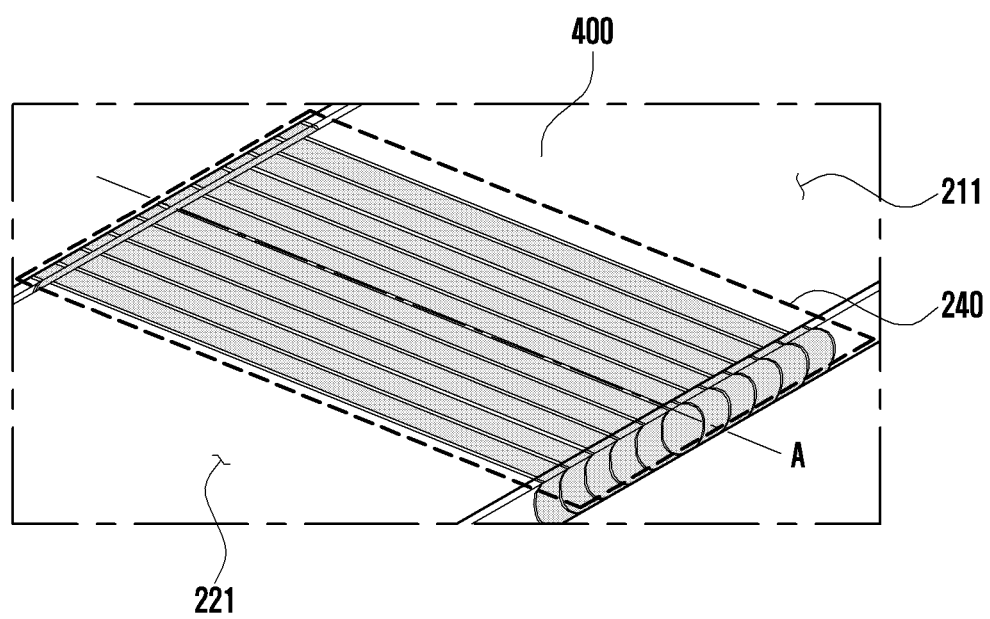
FIG. 4B is a view showing a hinge device capable of performing a folding operation and a sliding operation according to an embodiment of the disclosure.

FIG. 4B is a view showing a hinge device capable of performing a folding operation and a sliding operation according to an embodiment of the disclosure.

Referring to FIG. 4B, an electronic device (e.g., the electronic device 101 in FIG. 1) may include one pair of housings (e.g., the first housing 210 in FIG. 2A and the second housing 220 in FIG. 2A), and the first housing 210 and the second housing 220 may be rotatably coupled to be folded while facing each other with reference to a hinge device (e.g., the hinge device 240 in FIG. 2B). The hinge device 240 may be disposed between the first housing 210 and the second housing 220, and may support a folded state and/or an unfolded state of the electronic device 101. The electronic device 101 may operate in a folded state which is a form in which the first housing 210 and the second housing 220 face each other, based on a folding axis A. FIG. 4B shows a display region of the flexible display 400, based on the hinge device 240 in the electronic device 101 in an unfolded state.

Referring to FIG. 4B, the flexible display 400 may be disposed to extend from the first surface 211 of the first housing 210 to at least a part of the third surface 221 of the second housing 220 while crossing the hinge device 240. The hinge device 240 may support a folding operation so that the electronic device 101 in an unfolded state is changed to a folded state. The hinge device 240 may be mounted inside the electronic device 101, and the flexible display 400 may be disposed in the form of at least partially overlapping the hinge device 240. For example, the flexible display 400 may be at least partially folded in response to a folding operation of the hinge device 240.

The hinge device 240 may support a folded state of the electronic device 101, and may support a sliding operation of the electronic device 101 in a folded state. For example, the electronic device 101 may perform a folding operation, based on the folding axis A, but is not limited to the folding axis A. The hinge device 240 may be implemented to support a folding operation and a sliding operation of the electronic device 101.

Figure 4C:
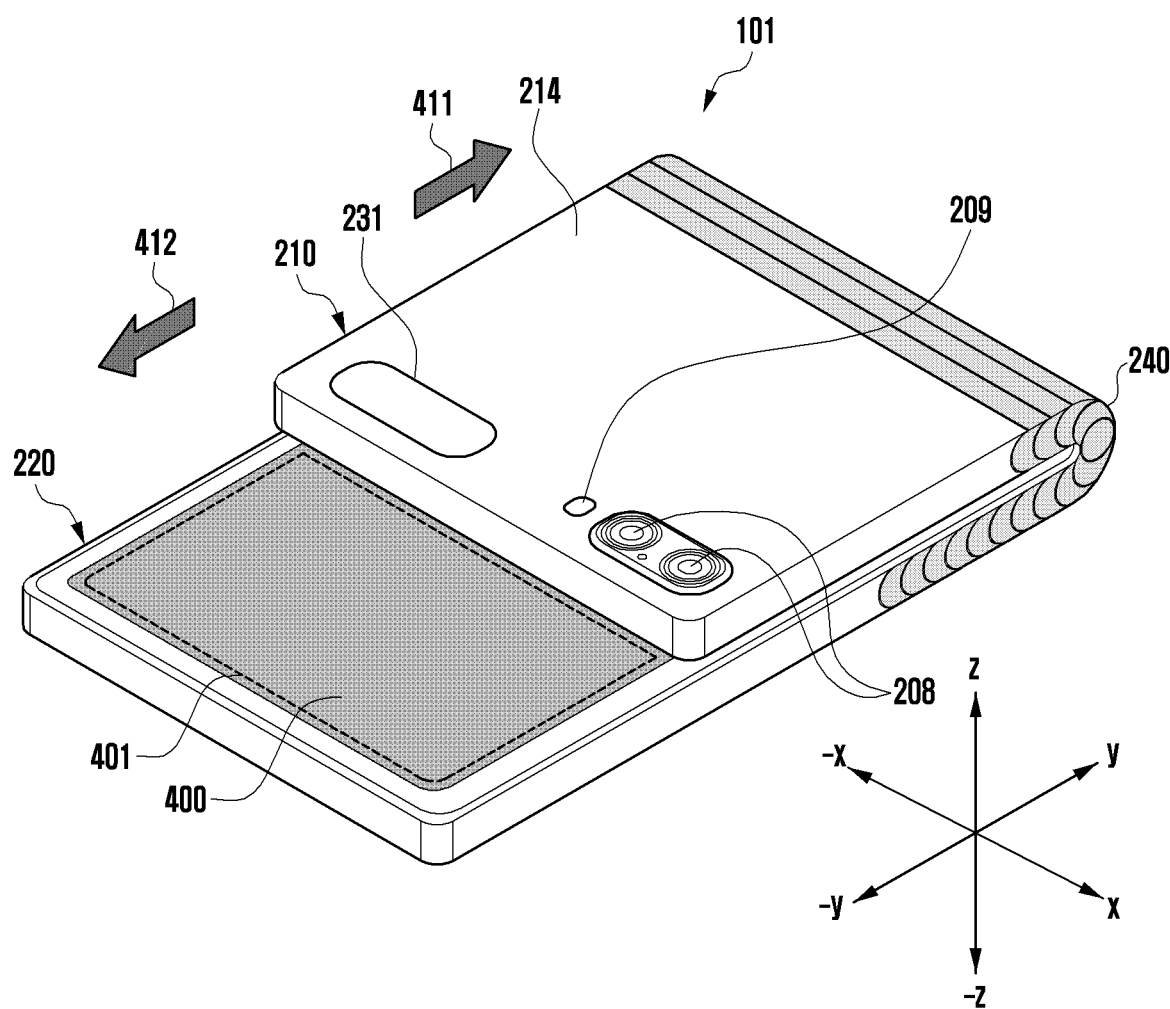
FIG. 4C is a perspective view showing a sliding operation of an electronic device in a folded state according to an embodiment of the disclosure.

FIG. 4C is a perspective view showing a sliding operation of an electronic device in a folded state according to an embodiment of the disclosure.

Referring to FIG. 4C, an electronic device (e.g., the electronic device 101 in FIG. 1) may include one pair of housings (e.g., the first housing 210 in FIG. 2A and the second housing 220 in FIG. 2A), and the first housing 210 and the second housing 220 may be rotatably coupled to be at least partially folded while facing each other by using a hinge device (e.g., the hinge device 240 in FIG. 2B).

Referring to FIG. 4C, the electronic device 101 may perform a sliding operation in a folded state, based on the hinge device 240. The hinge device 240 may support a folding operation in which the first housing 210 and the second housing 220 are folded while facing each other, and may support a sliding operation in which at least one of the first housing 210 and the second housing 220 moves by a predetermined distance along a predetermined direction in a folded state. For example, the sliding operation may include an operation in which the first housing 210 moves in the first direction 411 (e.g., the +y-axis direction), and/or an operation in which the second housing 220 moves in the second direction 412 (e.g., the −y-axis direction).

The electronic device 101 may be configured such that the at least a partial region 401 (e.g., a first display region) of the flexible display 400 is exposed to the outside in response to a sliding operation thereof. The electronic device 101 in a folded state may operate the flexible display 400 as the first mode (e.g., a first low-power mode), and may change a region of the flexible display 400 from the first mode to the second mode (e.g., a second low-power mode), in response to the sliding operation. The electronic device 101 may change the flexible display from the first mode to the second mode to correspond to the entire of the flexible display 400 or correspond to at least a partial region (e.g., the first display region 401) of the flexible display 400. The electronic device 101 may operate based on an operation frequency within a range of about 10 Hz-40 Hz in the first mode, and may operate based on an operation frequency within a range of about 30 Hz-60 Hz in the second mode.

The electronic device 101, which operates as the second mode (e.g., operates in a state in which the first display region 401 is exposed to the outside), may detect a specific event (e.g., a user touch input, a double touch input, a long touch input, and/or a double tap input) of the first display region 401, and may change the flexible display from the second mode to the third mode (e.g., a usual mode or a normal mode), in response to detection of the specific event. For example, the electronic device 101 may change the flexible display from the second mode to the third mode, based on the first display region 401. The electronic device 101 may fully activate the first display region 401 in the third mode. For example, the electronic device 101 may operate based on an operation frequency within a range of about 10 Hz-240 Hz in the third mode.

Figure 5:
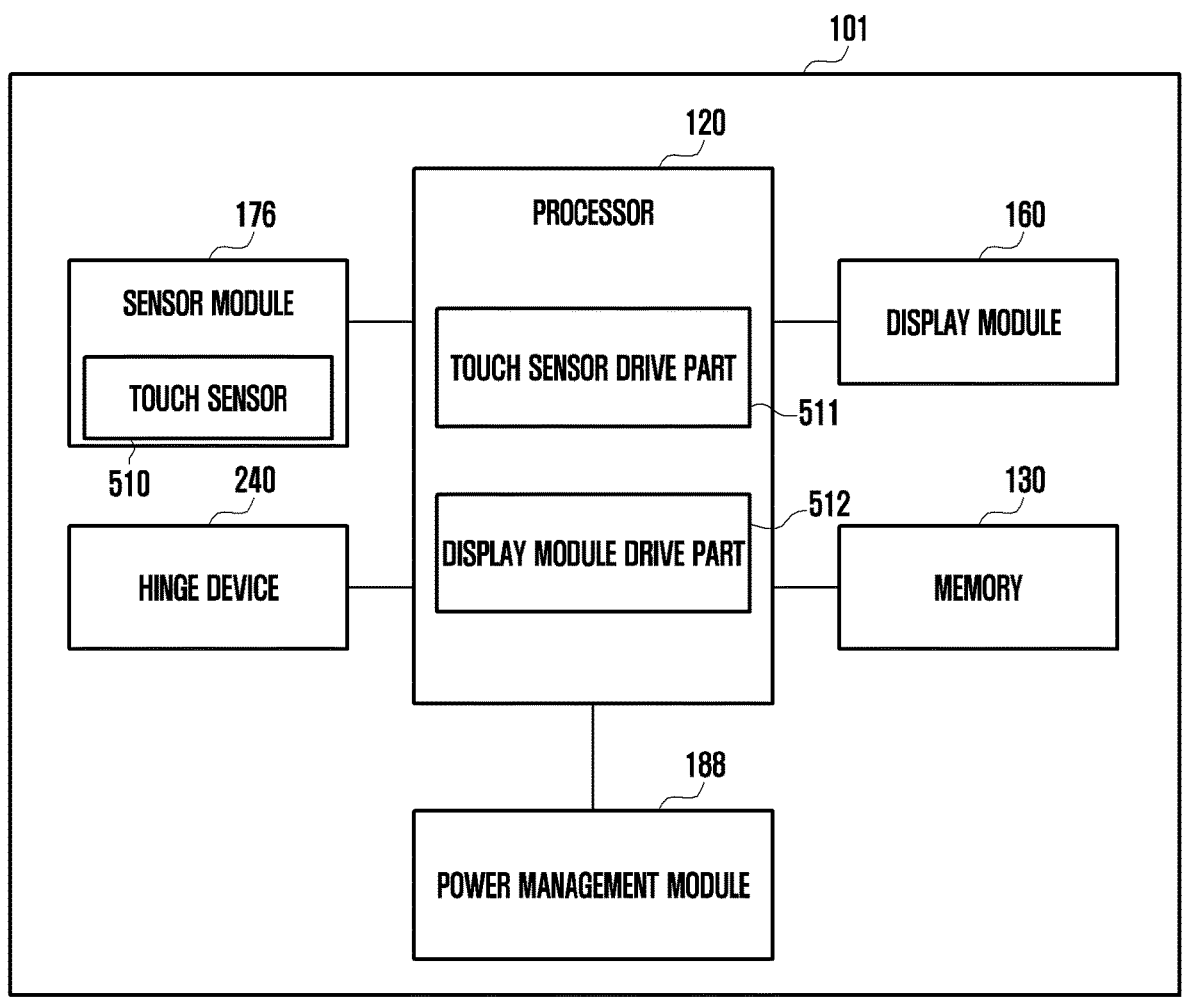
FIG. 5 is a block diagram of an electronic device according to an embodiment of the disclosure.

FIG. 5 is a block diagram of an electronic device according to an embodiment of the disclosure.

Referring to FIG. 5, an electronic device (e.g., the electronic device 101 in FIG. 1) may include one pair of housings (e.g., the first housing 210 in FIG. 2A and the second housing 220 in FIG. 2A), and the first housing 210 and the second housing 220 may be rotatably coupled to be folded while facing each other with reference to a hinge device (e.g., the hinge device 240 in FIG. 2B).

Referring to FIG. 5, the electronic device 101 may include a processor (e.g., the processor 120 in FIG. 1), a memory (e.g., the memory 130 in FIG. 1), a display module (e.g., the display module 160 in FIG. 1), a sensor module (e.g., the sensor module 176 in FIG. 1), a power management module (e.g., the power management module 188 in FIG. 1), and/or a hinge device (e.g., the hinge device 240 in FIG. 2B).

The processor 120 may execute a program (e.g., the program 140 in FIG. 1) stored in the memory 130 to control at least one other element (e.g., a hardware or a software element), and may preform various data processings or calculations. As at least a part of data processing or calculation, the processor 120 may store a command or data received from other elements (e.g., the display module 160, the sensor module 176, the power management module 188, and/or the hinge device 240) in the memory 130. The processor 120 may include a touch sensor drive part (a touch screen panel (TSP) IC) 511 for at least partially controlling the touch sensor 510 included in the sensor module 176, and a display module drive part 512 for at least partially controlling the display module 160. For example, the touch sensor drive part 511 may at least partially activate the touch sensor 510, and the display module drive part 512 may at least partially activate the display module 160. The touch sensor drive part 511 and the display module drive part 512 may be implemented as a single chip, and may be at least partially controlled by the processor 120.

According to an embodiment of the disclosure, in case that the electronic device 101 is in a folded state, the electronic device 101 may operate in the first mode, and may include a state in which the processor 120 and the touch sensor drive part 512 are at least partially activated. According to another embodiment, even in case that the processor 120 enters the sleep mode, the touch sensor 510 may also maintain an at least partially activated state through the touch sensor drive part 512. According to another embodiment, even in case that the processor 120 is in the sleep mode, the touch sensor drive part 512 may also detect a sliding operation of the electronic device 101 through the touch sensor 510.

The memory 130 may store various data used by at least one element (e.g., the processor 120, the display module 160, the sensor module 176, the power management module 188, and/or the hinge device 240) of the electronic device 101. For example, the data may include information on power applied to at least one element, based on an operation mode (e.g., a first mode (a first low-power mode), a second mode (a second low-power mode), or a third mode (a normal mode)) of a flexible display (e.g., the display module 160).

The display module 160 may visually provide various content to a user. The display module 160 may include a flexible display capable of being at least partially bent. In the electronic device 101 including the first housing 210 and the second housing 220, the display module 160 may be disposed to extend from the first housing 210 to the second housing 220. The display module 160 may support a folding operation in which the first housing 210 and the second housing 220 are folded while facing each other, and may be at least partially folded to correspond to the folding operation.

The sensor module 176 may detect whether a sliding operation has occurred in the electronic device 101 in a folded state. For example, the sensor module 176 may be at least partially disposed in the display module 160, and may include at least one channel included in the display module 160. According to an embodiment, in a folded state of the electronic device 101, the at least one channel may form a coupling relationship therebetween. The sensor module 176 may identify the coupling relationship of the at least one channel, and may determine that a sliding operation has occurred in case that the coupling relationship is broken. According to another embodiment, the sensor module 176 may include an illuminance sensor, and the processor 120 may detect a state in which at least a partial region (e.g., the first display region 401 in FIG. 4A) of the display module 160 is exposed to the outside by using the illuminance sensor. The sensor module 176 may include the touch sensor 510 (e.g., a touch proximity sensor), and the processor 120 may detect a state (e.g., a sliding operation of the electronic device 101) in which at least a partial region of the display module 160 is exposed to the outside by using the touch sensor 510. For example, the touch sensor 510 may include an IR sensor (e.g., an infrared sensor), an ultrasonic sensor, and/or an optical sensor. The touch sensor 510 may include mutual capacitance and/or self capacitance, and may be at least partially disposed on a screen of the electronic device 101, which corresponds to the display module 160. The processor 120 may identify whether the first display region 401 included in the display module 160 has been exposed to the outside by using the sensor module 176, and may operate in one operation mode among multiple operation modes (e.g., the first mode, the second mode, and/or the third mode).

The power management module 188 may be a configuration part for adjusting the amount of power supplied to the electronic device 101, based on an operation mode of the display module 160. For example, the processor 120 may supply power in response to an operation frequency of about 10 Hz or less, in case that the electronic device 101 operates as the first mode (e.g., a first low-power mode). The processor 120 may supply power in response to an operation frequency of about 10 Hz to about 60 Hz or less, in case that the electronic device 101 operates as the second mode (e.g., a second low-power mode). The processor 120 may supply power in response to an operation frequency of about 120 Hz or more, in case that the electronic device 101 operates as the third mode (e.g., a normal mode). The processor 120 may supply power through the power management module 188, based on at least one channel among multiple channels included in the display module 160.

The hinge device 240 may be disposed between the first housing 210 and the second housing 220 constituting the electronic device 101, and may support a folding operation, an unfolding operation, and/or a sliding operation of the electronic device 101. The hinge device 240 may support a sliding operation in the electronic device 101 in a folded state. The hinge device 240 may include a bendable hinge rail (e.g., a multi-joint hinge device or a multi-bar assembly) for supporting at least a part of the display module 160 (e.g., a flexible display). For example, the hinge device 240 may be formed of a multi-joint structure including at least one bar which allows the display module 160 (e.g., a flexible display) to be at least partially bent. The hinge device 240 may perform a sliding operation, based on the multi-joint structure. The hinge device 240 may be designed to perform an operation (e.g., a sliding operation) in which at least one housing of the first housing 210 and the second housing 220 is at least partially rolled through the hinge device 240 in the electronic device 101 in a folded state.

The electronic device 101 may identify a sliding operation of the first housing 210 and the second housing 220 by using the sensor module 176 in a state where the first housing 210 and the second housing 220 are folded in the form of facing each other. In response to the sliding operation, the electronic device 101 may be configured such that at least a partial region of the display module 160 (e.g., a flexible display or a main display) is exposed to the outside. The electronic device 101 may change an operation mode of at least a partial region (e.g., the first display region 401) of the display module 160 exposed to the outside, and may use the at least a partial region of the display module 160 as one display region. The electronic device 101 may variously use the display module 160.

The electronic device 101 may include the first housing 210, the second housing 220 connected to be foldable with respect to the first housing 210 through the hinge device 240, the flexible display 400 disposed to be supported by the second housing 220 through the hinge device 240 from the first housing 210, the touch sensor 510 at least partially disposed to correspond to the flexible display 400, the memory 130, and the processor 120 operatively connected to the flexible display 400, the touch sensor 510, and the memory 130. The processor 120 may operate at least a partial region of the touch sensor 510 in the first mode in a state where the first housing 210 and the second housing 220 are folded, may detect a sliding operation in the folded state, based on the flexible display 400, may identify the first display region 401 in which the flexible display 400 is exposed to the outside, in response to the sliding operation, and may switch the touch sensor 510 corresponding to the identified first display region 401 from the first mode to the second mode.

The processor 120 may identify whether a predetermined event has occurred, based on the first display region 401 switched to the second mode, and in response to occurrence of the event, may change the first display region, which is switched to the second mode, to the third mode.

The electronic device 101 may further include the power management module 188 for supplying power to the flexible display 400, and the processor 120 may supply power so that the flexible display has an operation frequency within the first frequency band range, based on the first mode, may supply power so that the flexible display 400 has an operation frequency within a second frequency band range, which at least partially overlaps the first frequency band range, based on the second mode, and may supply power so that the flexible display 400 has an operation frequency within a third frequency band range, which at least partially include the first frequency band range and the second frequency band range, based on the third mode.

The second mode may include a mode in which the first display region of the flexible display 400 operates in an at least partially activated state, and the processor 120 may at least partially detect a user touch input, based on the first display region switched to the second mode.

The electronic device 101 may be configured such that the flexible display 400 includes at least one channel, and the processor 120, based on a first channel included in the first housing 210 in a folded state, may measure a second current value, while measuring a first current value, based on a second channel included in the second housing 220, may identify a coupling relationship between the first channel and the second channel, based on the first current value and the second current value, and may detect a sliding operation, based on the identified coupling relationship.

The electronic device 101 may further include the sensor module 176 for detecting a sliding operation, and the processor 120 may detect the sliding operation by using the sensor module 176.

The sliding operation may include an operation in which at least one housing of the first housing 210 and the second housing 220 in a folded state moves in a predetermined direction by a predetermined distance.

The hinge device 240 may support the folded state in which the first housing 210 and the second housing 220 are arranged to face each other, and may support the sliding operation in which at least one housing of the first housing 210 and the second housing 220 moves in a predetermined direction by a predetermined distance.

The hinge device 240 may be formed of a multi-joint structure including at least one bar which allows the flexible display 400 to be at least partially bent, and the sliding operation may be performed based on the multi-joint structure.

Figure 6:
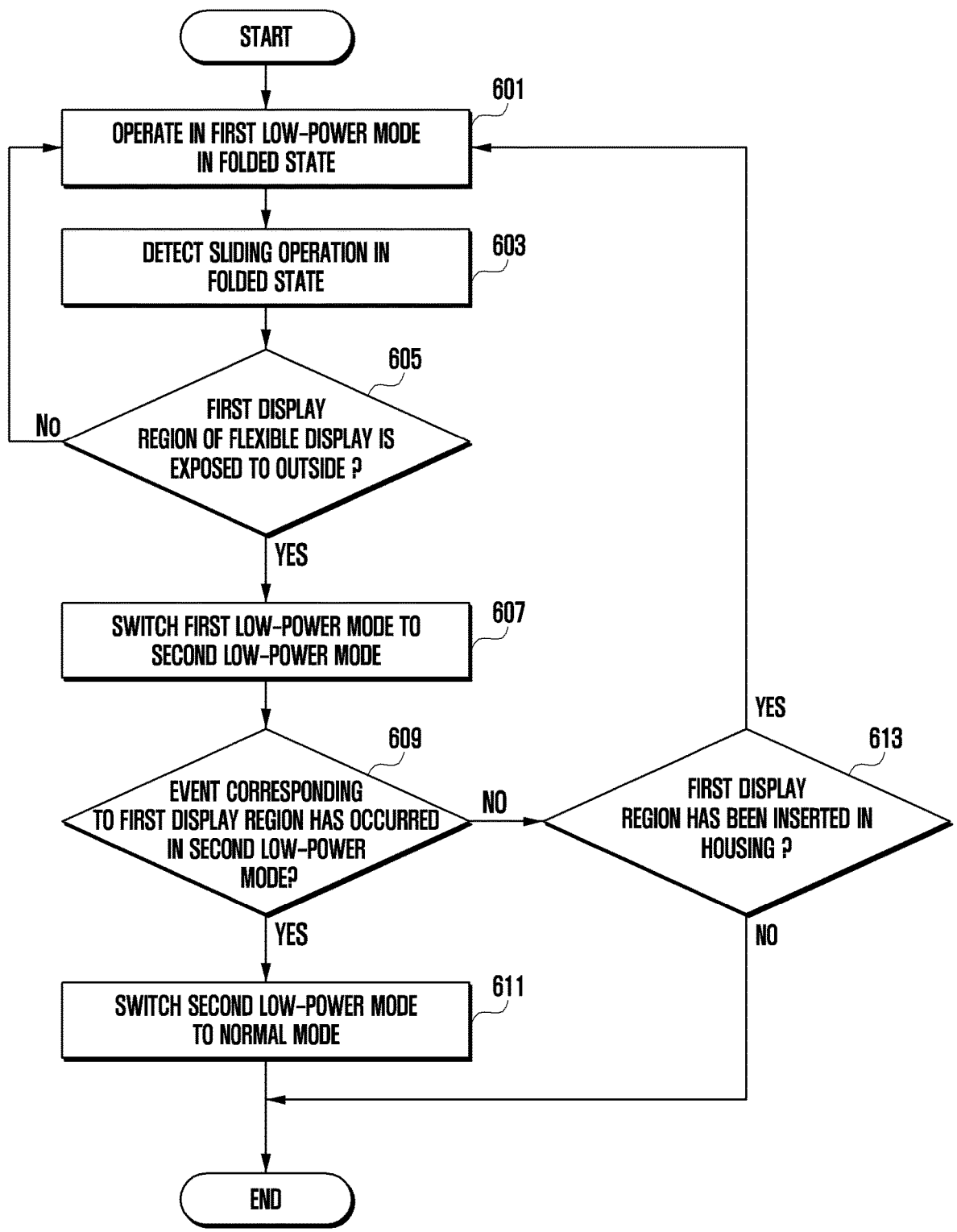
FIG. 6 is a flowchart showing an operation method according to a sliding operation of an electronic device in a folded state according to an embodiment of the disclosure.

FIG. 6 is a flowchart showing an operation method according to a sliding operation of an electronic device in a folded state according to an embodiment of the disclosure.

Referring to FIG. 6, an electronic device (e.g., the electronic device 101 in FIG. 1) may include one pair of housings (e.g., the first housing 210 in FIG. 2A and the second housing 220 in FIG. 2A), and the first housing 210 and the second housing 220 may be rotatably coupled to be folded while facing each other with reference to a hinge device (e.g., the hinge device 240 in FIG. 2B). The hinge device 240 may be disposed between the first housing 210 and the second housing 220, and may support a folded state and/or an unfolded state of the electronic device 101. The hinge device 240 may include a bendable hinge rail (e.g., a multi-joint hinge device or a multi-bar assembly) for supporting at least a part of a flexible display (e.g., the display module 160 in FIG. 1). The electronic device 101 may perform a sliding operation through the hinge device 240 in a folded state. For example, the sliding operation may include an operation in which at least one housing of the first housing 210 and the second housing 220 slides in a predetermined direction by a predetermined distance. The hinge device 240 may be designed in the form capable of supporting a folding operation, an unfolding operation, and/or a sliding operation of the electronic device 101 in a folded state.

In operation 601, the processor 120 of the electronic device 101 may be configured to operate in a first low-power mode (e.g., a first mode) in a folding state (e.g., a folded state). For example, the electronic device 101 may be in a folded state in which the first housing 210 and the second housing 220 face each other. The processor 120 may supply power to have an operation frequency within a first frequency band range (e.g., a frequency band within a range of about 10 Hz-40 Hz) in case of operating in the first low-power mode. In case of being in the first low-power mode, the electronic device 101 may be in a state in which the flexible display 160 is deactivated, and a screen is turned off. The electronic device 101 in the first low-power mode may at least partially activate a touch sensor (e.g., the touch sensor 510 in FIG. 5) which is at least partially disposed to correspond to the flexible display 160. For example, the electronic device 101 may detect a sliding operation of the electronic device 101, based on the activated touch sensor 510.

In operation 603, the processor 120 may detect a sliding operation in a folded state. The flexible display 160 may include multiple channels, and may be in a state in which one or more channels are coupled to each other in a folded state. For example, the channels may operate as a touch sensor 510. For example, in case that the electronic device 101 is in a folded state, the flexible display 160 may be in a state of being at least partially in contact therewith. The folded state may be a state in which a region of the flexible display 160, which is disposed on a first surface (e.g., the first surface 211 in FIG. 2B) of the first housing 210, and a region of the flexible display 160, which is disposed on a third surface (e.g., the third surface 221 in FIG. 2B) of the second housing 220 are in contact with each other. In case that at least one channel (e.g., a first channel) disposed in the first housing 210, and at least one channel (e.g., a second channel) disposed in the second housing 220 are in close contact with each other in less than a predetermined distance, the first channel and the second channel may be in a state of being coupled to each other. The electronic device 101 may use at least one channel as a touch sensor (e.g., the touch sensor 510 in FIG. 5). The processor 120 may identify whether a coupling state is maintained, based on an analog-digital converter (ADC) value (e.g., a current value or intensity) corresponding to the at least one channel. The processor 120 may detect a state in which the channels having a relationship coupled to each other are released, and the release of the coupled relationship may mean detection of a sliding operation.

In operation 605, the processor 120 may determine whether the first display region (e.g., the first display region 401 in FIG. 4A) of the flexible display 160 has been exposed to the outside. The processor 120 may set a threshold value of the size of the first display region, for a change of an operation mode. The processor 120 may identify the size of the first display region, which is exposed to the outside, in response to the sliding operation, and may determine that the first display region 401 is exposed to the outside in case that the size of the first display region exceeds the threshold value.

In case that the first display region 401 is exposed to the outside, in operation 607, the processor 120 may switch an operation mode of the flexible display 160 from the first low-power mode (e.g., the first mode) to the second low-power mode (e.g., the second mode). The processor 120 may change the flexible display from a first low-power mode to a second low-power mode, based on the first display region 401 of the flexible display 160, which is exposed to the outside. The processor 120 may supply power to have an operation frequency within a second frequency band range (e.g., a frequency band within a range of about 40 Hz-60 Hz) in case of being in the second low-power mode. For example, the second frequency band range may at least partially include the first frequency band range. In case of being in the second low-power mode, the first display region 401 of the flexible display 160 may perform at least a part of a touch input or at least a part of a function thereof. In case of being in the second low-power mode, the processor 120 may limit an operation of the flexible display 160. The processor 120 may at least partially activate the first display region 401 in case of operating in the second low-power mode. For example, the processor 120 may display notification information in the activated first display region 401.

In operation 605, in case that the first display region 401 is not exposed to the outside in operation 605, returning to operation 601, the processor 120 may maintain the first display region 401 to the first low-power mode. For example, after detecting a sliding operation in operation 603, in case that the first display region 160 is not exposed to the outside within a predetermined time period, in operation 601, the processor 120 may maintain an operation mode of the first display region 401 to the first low-power mode.

In operation 609, the processor 120 may determine whether an event corresponding to the first display region 401 has occurred in the second low-power mode. For example, the event may be set in advance or set by a user, and may include events according to specific conditions, such as a double touch input, a long touch input, and/or a double tap input. In case that an event of the first display region 401 has occurred, the processor 120 may change an operation mode of the first display region 401.

In response to occurrence of an event of the first display region 401, in operation 611, the processor 120 may switch the flexible display from the second low-power mode (e.g., a second mode) to the general mode (e.g., a third mode or a normal mode). For example, in case of being in the general mode, the processor 120 may activate all functions related to the first display region 401 of the flexible display 160. In case of operating in the general mode, the processor 120 may supply power to have an operation frequency within a third frequency band range (e.g., a frequency band within a range of about 10 Hz-240 Hz). For example, the third frequency band range may at least partially include the first frequency band range and the second frequency band range.

In operation 609, in case that the event of the first display region 401 has not occurred, then in operation 613, the processor 120 may determine whether the first display region 401 has been inserted in the housing. For example, in a state where the first display region 401 is exposed to the outside, the processor 120 may maintain the second low-power mode, and may periodically determine whether the first display region 401 has been inserted in the housing. For example, as operation 603, the processor 120 may identify whether there is a coupling relationship of the at least one channel, and may determine whether the first display region 401 has been inserted in the housing, based on the maintenance or release of the coupling relationship. In operation 613, in case that the first display region 401 has been inserted in the housing, returning to operation 601, the processor 120 may change an operation mode of the first display region 401 to the first low-power mode. In operation 613, in case that the first display region 401 has not been inserted in the housing, the processor 120 may maintain an operation mode of the first display region 401 to the second low-power mode.

Figure 7A:
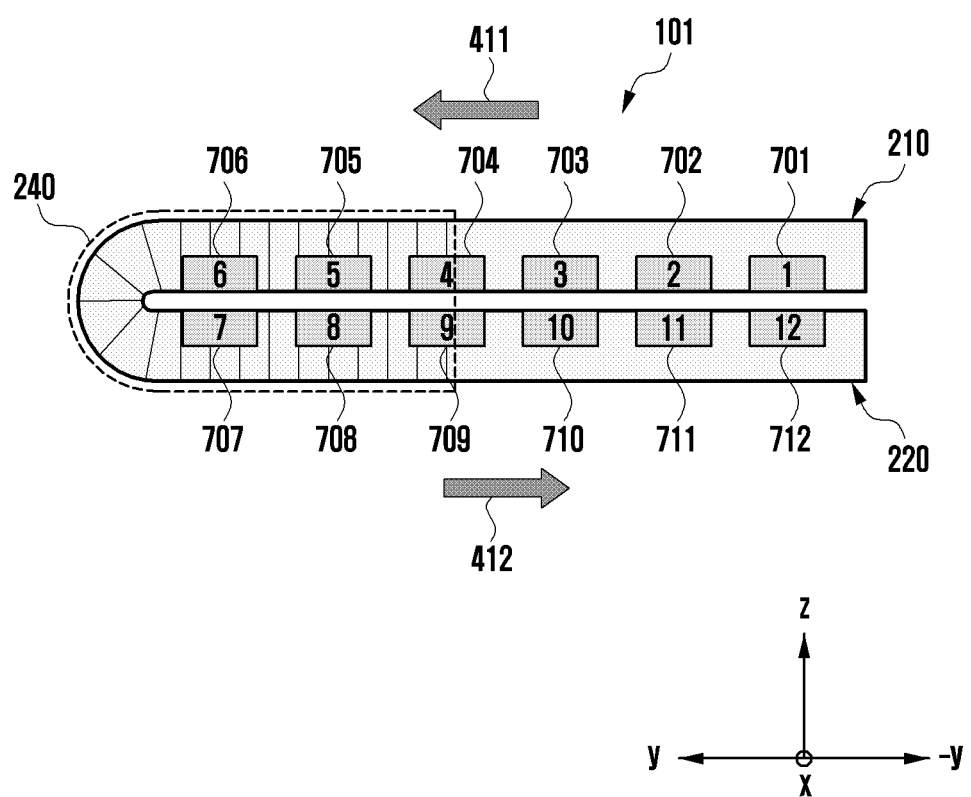
FIG. 7A is a view showing at least one channel included in a flexible display in case that an electronic device in a folded state according to an embodiment of the disclosure.
Figure 7B:
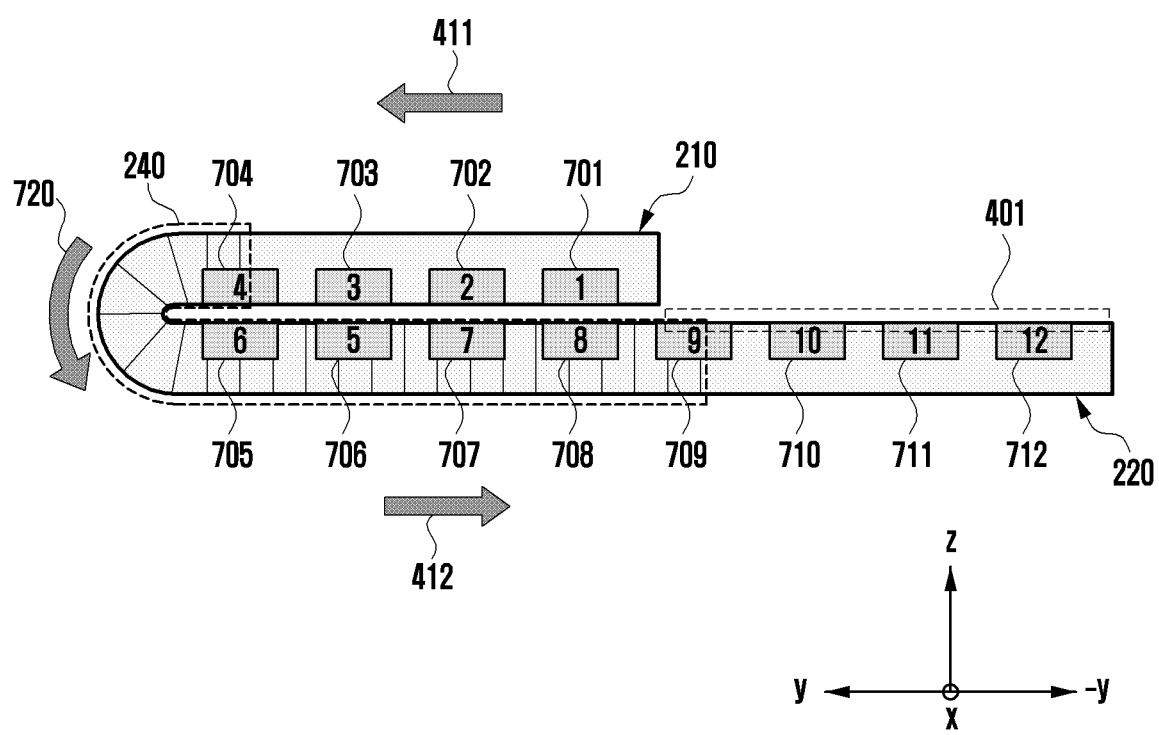
FIG. 7B is a view showing at least one channel included in a flexible display in case that a sliding operation has occurred in an electronic device in a folded state according to an embodiment of the disclosure.

FIG. 7A is a view showing at least one channel included in a flexible display in case that an electronic device in a folded state according to an embodiment of the disclosure. FIG. 7B is a view showing at least one channel included in a flexible display in case that a sliding operation has occurred in an electronic device in a folded state according to an embodiment of the disclosure.

FIGS. 7A and 7B show a method for detecting a sliding operation of an electronic device in a folded state according to various embodiments of the disclosure. FIG. 7A is a perspective view in which at least one channel included in a flexible display (e.g., the display module 160 in FIG. 1) is disposed, in case that an electronic device (e.g., the electronic device 101 in FIG. 1) is in a folded state. FIG. 7B is a perspective view in which at least one channel included in the flexible display 160 is disposed, in case that a sliding operation has occurred in the electronic device 101 in a folded state.

Referring to FIGS. 7A and 7, the electronic device 101 may include one pair of housings (e.g., the first housing 210 in FIG. 2A and the second housing 220 in FIG. 2A), and the first housing 210 and the second housing 220 may be rotatably coupled to be folded while facing each other with reference to a hinge device (e.g., the hinge device 240 in FIG. 2B). The hinge device 240 may be disposed to connect the first housing 210 and the second housing 220, and may be implemented in the form of supporting a folded state and/or an unfolded state of the electronic device 101. The hinge device 240 may include a bendable hinge rail (e.g., a multi-joint hinge device or a multi-bar assembly) for supporting at least a part of a flexible display (e.g., the display module 160 in FIG. 1). According to an embodiment, the hinge device 240 may be designed to perform a sliding operation in a folded state.

Referring to FIG. 7A, the first housing 210 and the second housing 220 may be arranged in the form of facing each other, based on the hinge device 240. The flexible display 160 may include at least one channel, in displaying a screen. The electronic device 101 in a folded state may be disposed in the form in which at least one channel disposed in the first housing 210 and at least one channel disposed in the second housing 220 face each other. For example, a first channel 701 may face a twelfth channel 712, and a second channel 702 may face an eleventh channel 711. Referring to FIG. 7A, multiple channels (e.g., 701, 702, 703, 704, 705, and 706) arranged in the first housing 210 may be arranged in the form of facing multiple channels (e.g., 712, 711, 710, 709, 708, and 707) arranged in the second housing 220. At least one channel may operate as the touch sensor 510 included in the sensor module 176 of the electronic device 101. The electronic device 101 in a folded state may form a coupling relationship, based on at least one channel, and the processor 120 may detect the at least one channel on which a coupling relationship is formed. For example, in case that a spaced distance between one or more channels is within a predetermined distance, a coupling relationship may be formed. The processor 120 may identify a coupling relationship between specific channels, and may determine an operation mode of the electronic device 101. For example, the processor 120 may determine that the electronic device 101 is in a folded state in case that it is identified that a coupling relationship has been formed between the first channel 701 and the twelfth channel 712. The electronic device 101 in a folded state may operate in the first low-power mode (e.g., a first mode), and in case of being in the first low-power mode, the processor 120 may detect whether a coupling relationship has been formed based on at least one channel.

In an embodiment, the electronic device 101 in a folded state may perform a sliding operation in a predetermined direction, based on the hinge device 240. For example, the sliding operation may include an operation in which the first housing 210 moves along the first direction 411 (e.g., the y-axis direction). For example, the sliding operation may include an operation in which the second housing 220 moves along the second direction 412 (e.g., the −y-axis direction). During the sliding operation, a region of the flexible display 160, which corresponds to the first housing 210, may be disposed to correspond to the second housing 220 while the hinge device 240 maintains the bent shape thereof.

Referring to FIG. 7B, the electronic device 101 in a folded state may perform a sliding operation. The first housing 210 may move at least partially along the first direction 411 (e.g., the y-axis direction), and the second housing 220 may move at least partially along the second direction 412 (e.g., the −y-axis direction). The display region of the flexible display 160, which corresponds to the first housing 210, may become smaller, and relatively, the display region of the flexible display 160, which corresponds to the second housing 220, may become larger. During the sliding operation, the hinge device 240 may move at least partially along the third direction 720 (e.g., the curved-surface direction).

Referring to FIG. 7B, in case that a sliding operation is performed in the electronic device 101, a coupling relationship may be formed between the first channel 701 and an eighth channel 708, and a coupling relationship may be formed between the second channel 702 and a seventh channel 707. In case that a coupling relationship is formed between specific channels, the processor 120 may determine that a sliding operation has occurred. In response to the sliding operation, the processor 120 may identify that the coupling relationship of a ninth channel 709 to the twelfth channel 712 has been released. For example, a display region (e.g., the first display region 401) of the flexible display 160, which corresponds to the ninth channel 709 to the twelfth channel 712, in which the coupling relationship has been released, may include a display region exposed to the outside. The processor 120 may switch an operation mode of the first display region 401 from the first low-power mode (e.g., a first mode) to the second low-power mode (e.g., a second mode).

The electronic device 101 may detect whether there is a sliding operation, based on at least one channel included in the flexible display 160. For example, the electronic device 101 may use the at least one channel as a proximity sensor, and may determine whether there is a proximity between specific channels. The processor 120 may measure an ADC value (e.g., a current value or intensity) between one or more channels, and may determine whether there is a formation and/or a release of a coupling relationship, based on the measured ADC value. For example, the processor 120 may identify a change amount of the ADC value, based on at least one channel, and may determine whether there is a release of the coupling relationship according to the sliding operation, based on the change amount. According to another embodiment, the processor 120 may detect whether there is a sliding operation, based on the size of the first display region 401 exposed to the outside. For example, the processor 120 may set the size of the first display region 401, and may identify at least one channel in which a coupling relationship is formed in case that the first display region 401 having the set size has been exposed to the outside. In case that the identified at least one channel forms a coupling relationship, the processor 120 may identify that the first display region 401 having the set size has been exposed to the outside, and may change an operation mode of the first display region 401.

The electronic device 101 may use at least one channel as a touch sensor (e.g., a touch proximity sensor), based on a capacitive method. The electronic device 101 may detect whether there is a sliding operation corresponding to at least one housing by using the at least one channel. According to another embodiment, the electronic device 101 may include at least one of a separate infrared ray (IR) sensor, ultrasonic sensor, and/or optical sensor, and by using the sensor, may also detect whether there is a sliding operation corresponding to at least one housing.

According to another embodiment, the electronic device 101 may include an additional sensor (e.g., a Hall sensor, an illuminance sensor, and/or a touch sensor) for detecting a sliding operation. For example, the electronic device 101 may include a Hall sensor which is at least partially coupled to the hinge device 240, and may detect whether there is a sliding operation by using the Hall sensor. In another example, the electronic device 101 may include an illuminance sensor which is at least partially disposed in at least one housing and/or the flexible display 400. The illuminance sensor may be disposed in a portion exposed to the outside in response to a sliding operation. The electronic device 101 may detect whether there is a sliding operation by using the illuminance sensor.

A method according to various embodiments of the disclosure may include operating, in a first mode, at least a partial region of a touch sensor (e.g., the touch sensor 510 in FIG. 5) corresponding to a flexible display (e.g., the flexible display 400 in FIG. 2A) supported by a first housing 210 and a second housing 220, in a state where the first housing (e.g., the first housing 210 in FIG. 2A) and the second housing (the second housing 220 in FIG. 2A) are folded, based on a hinge device (e.g., the hinge device 240 in FIG. 2B), detecting a sliding operation in the folded state, based on the flexible display 400, identifying a first display region in which the flexible display 400 is exposed to the outside, in response to the sliding operation, and switching the touch sensor 510 corresponding to the identified first display region from the first mode to a second mode.

The method may further include identifying whether a predetermined event has occurred, based on the first display region switched to the second mode, and changing the first display region, which has been switched to the second mode, to a third mode, in response to occurrence of the event.

The method may further include supplying power so that the flexible display 400 has an operation frequency within a first frequency band range, based on the first mode, supplying power so that the flexible display 400 has an operation frequency within a second frequency band range, which at least partially overlaps the first frequency band range, based on the second mode, and supplying power so that the flexible display 400 has an operation frequency within a third frequency band range, which at least partially includes the first frequency band range and the second frequency band range, based on the third mode.

The second mode may further include a mode in which the first display region (e.g., the first display region 401 in FIG. 4A) of the flexible display 400 operates in an at least partially activated state, and the method may further include at least partially detecting a user touch input, based on the first display region switched to the second mode.

The detecting a sliding operation may include measuring a first current value corresponding a first channel included in the first housing 210 in the folded state, based on at least one channel included in the flexible display 400, measuring a second current value corresponding a second channel included in the second housing 220 in the folded state, identifying a coupling relationship between the first channel and the second channel, based on the first current value and the second current value, and detecting the sliding operation, based on the identified coupling relationship.

The hinge device 240 may be formed of a multi-joint structure including at least one bar configured to at least partially bend the flexible display 400, and the hinge device 240 may be configured to support the folded state in which the first housing 210 and the second housing 220 are arranged in the form of facing each other, and support the sliding operation in which at least one housing of the first housing 210 and the second housing 220 moves in a predetermined direction by a predetermined distance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing having a first surface and a second surface;
   a second housing having a third surface and a fourth surface, the second housing being foldably connected to the first housing through a hinge device;
   a flexible display disposed to be supported by the third surface of the second housing through the hinge device from the first surface of the first housing;
   a touch sensor at least partially disposed to correspond to the flexible display;
   memory storing one or more computer programs; and
   one or more processors communicatively coupled to the flexible display, the touch sensor, and the memory,
   wherein the one or more computer programs include computer-executable instructions that, when executed by the one or more processors individually or collectively, cause the electronic device to:
      operate at least a partial region of the touch sensor in a first mode, while the electronic device is in a folded state in which the first surface of the first housing and the third surface of the second housing face each other and the second surface of the first housing includes a sub-display exposed to an outside of the electronic device,
      based on the flexible display, detect a sliding operation while the electronic device is in the folded state, and
      in response to detecting the sliding operation, identify a first display region in which the flexible display is exposed to the outside and switch an operation mode of the touch sensor from the first mode to a second mode in a region of the touch sensor corresponding to the first display region.

2. The electronic device of claim 1, wherein the one or more computer programs further include computer-executable instructions that, when executed by the one or more processors individually or collectively, cause the electronic device to:
   based on the switching of the operation mode of the touch sensor in the first display region to the second mode, identify whether a predetermined event has occurred, and
   in response to determining that the predetermined event has occurred, switch the operation mode of the touch sensor in the first display region from the second mode to a third mode.

3. The electronic device of claim 2, further comprising:
   power management circuitry configured to supply power to the flexible display,
   wherein the one or more computer programs further include computer-executable instructions that, when executed by the one or more processors individually or collectively, cause the electronic device to:

based on operating the touch sensor in the first mode, supply power so that the flexible display has an operation frequency within a first frequency band range, and based on operating the touch sensor in the second mode, supply power so that the flexible display has the operation frequency within a second frequency band range, at least partially overlapping the first frequency band range.

4. The electronic device of claim 3, wherein the one or more computer programs further include computer-executable instructions that, when executed by the one or more processors individually or collectively, cause the electronic device to:

based on operating the touch sensor in the second mode, supply power so that the flexible display has the operation frequency within a third frequency band range at least partially including the first frequency band range and the second frequency band range.

5. The electronic device of claim 3, wherein the second mode comprises a mode in which the first display region of the flexible display operates in an at least partially activated state, and wherein the one or more computer programs further include computer-executable instructions that, when executed by the one or more processors individually or collectively, cause the electronic device to:

based on the switching of the operation mode of the touch sensor in the first display region to the second mode, at least partially detect a user touch input applied to the first display region.

6. The electronic device of claim 1, wherein the flexible display comprises at least one channel, and wherein the one or more computer programs further include computer-executable instructions that, when executed by the one or more processors individually or collectively, cause the electronic device to:

measure a second current value, based on a second channel included in the second housing, while measuring a first current value, based on a first channel included in the first housing in the folded state, identify a coupling relationship between the first channel and the second channel, based on the first current value and the second current value, and detect the sliding operation based on the coupling relationship.

7. The electronic device of claim 1, further comprising: sensor circuitry configured to detect the sliding operation, wherein the one or more computer programs further include computer-executable instructions that, when executed by the one or more processors individually or collectively, cause the electronic device to:

detect the sliding operation by using the sensor circuitry.

8. The electronic device of claim 1, wherein the sliding operation comprises an operation in which at least one housing of the first housing and the second housing in the folded state moves in a predetermined direction by a predetermined distance.

9. The electronic device of claim 1, wherein the hinge device is configured to:

support the folded state in which the first surface of first housing and third surface of the second housing face each other; and support the sliding operation in which at least one housing of the first housing and the second housing moves in a predetermined direction by a predetermined distance.

10. The electronic device of claim 1, wherein the hinge device is formed of a multi-joint structure comprising at least one bar configured to at least partially bend the flexible display, and wherein the hinge device is configured to perform the sliding operation based on the multi-joint structure.

11. The electronic device of claim 1, wherein the second surface of the first housing includes a rear cover of the electronic device, and wherein the sub-display is disposed separately from the flexible display and is visible from the outside through a partial region of the rear cover.

12. A method performed by an electronic device, the method comprising:

operating, by the electronic device, at least a partial region of a touch sensor in a first mode while the electronic device is in a folded state based on a hinge device, the touch sensor corresponding to a flexible display supported by a first housing and a second housing of the electronic device, the folded state being a state in which a first surface of the first housing and a third surface of the second housing face each other and a second surface of the first housing includes a sub-display exposed to an outside of the electronic device;

based on the flexible display, detecting, by the electronic device, a sliding operation while the electronic device is in the folded state; and in response to detecting the sliding operation, identifying, by the electronic device, a first display region in which the flexible display is exposed to the outside and switching, by the electronic device, an operation mode of the touch sensor from the first mode to a second mode in a region of the touch sensor corresponding to the first display region.

13. The method of claim 12, further comprising:

based on the switching of the operation mode of the touch sensor in the first display region to the second mode, identifying, by the electronic device, whether a predetermined event has occurred; and in response to determining that the predetermined event has occurred, switching, by the electronic device, the operation mode of the touch sensor in the first display region from the second mode to a third mode.

14. The method of claim 13, further comprising:

based on operating the touch sensor in the first mode, supplying, by the electronic device, power so that the flexible display has an operation frequency within a first frequency band range; and based on operating the touch sensor in the second mode, supplying, by the electronic device, power so that the flexible display has the operation frequency within a second frequency band range at least partially lapping the first frequency band range.

15. The method of claim 14, further comprising:

based on operating the touch sensor in the third mode, supplying, by the electronic device, power so that the flexible display has an operation frequency within a third frequency band range, at least partially including the first frequency band range and the second frequency band range.

16. The method of claim 15, wherein the first mode is a normal mode, wherein the second mode is a low-power mode consuming less power than the first mode.

17. The method of claim 16, wherein the third mode is a low power mode consuming more power than the second mode.

18. The method of claim 14,
wherein the second mode comprises a mode in which the first display region of the flexible display operates in an at least partially activated state, and
wherein the method further comprises:
based on the switching of the operation mode of the touch sensor in the first display region to the second mode, at least partially detecting, by the electronic device, a user touch input applied to the first display region.

19. The method of claim 12, wherein the detecting of the sliding operation comprises:
measuring, by the electronic device, a first current value corresponding a first channel included in the first housing in the folded state, based on at least one channel included in the flexible display;
measuring, by the electronic device, a second current value corresponding a second channel included in the second housing in the folded state;
identifying, by the electronic device, a coupling relationship between the first channel and the second channel, based on the first current value and the second current value; and
detecting, by the electronic device, the sliding operation, based on the coupling relationship.

20. The method of claim 12, wherein the hinge device is formed of a multi-joint structure including at least one bar configured to at least partially bend the flexible display.

21. The method of claim 12, wherein the hinge device is configured to:
support the folded state in which the first surface of the first housing and the third surface of the second housing face each other; and
support the sliding operation in which at least one housing of the first housing and the second housing moves in a predetermined direction by a predetermined distance.

* * * * *